US012482426B2

(12) United States Patent
Sun et al.

(10) Patent No.: US 12,482,426 B2
(45) Date of Patent: Nov. 25, 2025

(54) GATE DRIVING UNIT AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Feixiang Sun, Hubei (CN); Yi Liu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/291,571

(22) PCT Filed: Nov. 30, 2023

(86) PCT No.: PCT/CN2023/135530

§ 371 (c)(1),
(2) Date: Jan. 23, 2024

(87) PCT Pub. No.: WO2025/107346

PCT Pub. Date: May 30, 2025

(65) Prior Publication Data

US 2025/0225936 A1 Jul. 10, 2025

(30) Foreign Application Priority Data

Nov. 24, 2023 (CN) ......................... 202311591427.9

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0852* (2013.01);
(Continued)

(58) Field of Classification Search
None
See application file for complete search history.

(56) References Cited

U.S. PATENT DOCUMENTS

2016/0005346 A1* 1/2016 Kim ..................... G09G 3/3266 345/55
2020/0066211 A1* 2/2020 Lee ...................... G09G 3/3275
(Continued)

FOREIGN PATENT DOCUMENTS

CN 111696483 A 9/2020
CN 114333698 A 4/2022
(Continued)

OTHER PUBLICATIONS

CN115578965A translation (Year: 2023).*
(Continued)

*Primary Examiner* — Dorothy Harris
(74) *Attorney, Agent, or Firm* — PV IP PC; Wei Te Chung

(57) ABSTRACT

A gate driving unit and a display panel are provided by the present disclosure. In a writing frame of the display panel, a clock signal has a plurality of transitions between an active level state and an in active level state. In a plurality of holding frames of the display panel, the clock signal has a plurality of first periods holding the inactive level state, and the clock signal has a plurality of transitions between the active level state and the inactive level state in a second period between two adjacent first periods.

14 Claims, 9 Drawing Sheets

(52) U.S. Cl.
CPC ............... *G09G 2300/0861* (2013.01); *G09G 2310/0286* (2013.01); *G09G 2310/08* (2013.01); *G09G 2320/045* (2013.01); *G09G 2330/021* (2013.01); *G09G 2340/0435* (2013.01)

(56) References Cited

U.S. PATENT DOCUMENTS

| | | | | |
|---|---|---|---|---|
| 2022/0383822 | A1* | 12/2022 | Shang | G09G 3/3266 |
| 2023/0137517 | A1* | 5/2023 | Fu | G09G 3/32<br>345/214 |
| 2023/0335053 | A1* | 10/2023 | Jiang | G09G 3/3233 |
| 2024/0161702 | A1* | 5/2024 | Kim | G09G 3/3291 |
| 2025/0087167 | A1* | 3/2025 | Deng | G09G 3/3677 |

FOREIGN PATENT DOCUMENTS

| | | | | | |
|---|---|---|---|---|---|
| CN | 114783348 | A | | 7/2022 | |
| CN | 115578965 | A | * | 1/2023 | G09G 3/20 |
| CN | 115631711 | A | | 1/2023 | |
| CN | 115953978 | A | | 4/2023 | |
| CN | 116092562 | A | | 5/2023 | |
| CN | 116229859 | A | | 6/2023 | |

OTHER PUBLICATIONS

International Search Report in International application No. PCT/CN2023/135530, mailed on Aug. 16, 2024.

Written Opinion of the International Search Authority in International application No. PCT/CN2023/135530, mailed on Aug. 16, 2024.

* cited by examiner

GATE DRIVING UNIT AND DISPLAY PANEL

CROSS-REFERENCE TO RELATED APPLICATIONS

This application is a continuation of International Application No. PCT/CN2023/135530, filed on Nov. 30, 2023, which claims priority to and the benefit of Chinese Patent Application No. 202311591427.9, filed on Nov. 24, 2023. The disclosures of the aforementioned applications are incorporated herein by reference in their entireties.

TECHNICAL FIELD

The present disclosure relates to a technical field of display, and in particular to a gate driving unit and a display panel.

BACKGROUND

When display panels are driven with low refresh frequencies, clock signals are placed in a DC state to reduce the power consumption of the display panels. However, leakage currents of transistors may increase in high-temperature environments influenced by characteristics of semiconductor devices, resulting in charge loss at key nodes of gate driving circuits to which the transistors and the clock signals are applied, potentials at the key points are changed, gate controlling signals output by the gate driving circuits are abnormal, and the display panels to which the gate controlling signals are applied are abnormal, thereby affecting the display effect of the display panels.

SUMMARY

Embodiments of the present disclosure provide a gate driving unit and a display panel to improve a problem that gate controlling signals are abnormal influenced by characteristics of semiconductor devices, which affects the display effect.

The embodiments of the present disclosure provide a gate driving unit including a plurality of gate driving circuits configured to output a plurality of gate controlling signals to a plurality of sub-pixels of a display panel. Each of the plurality of gate driving circuits includes a starting transistor and a first output transistor. A control terminal of the starting transistor is configured to receive a clock signal, an input terminal of the starting transistor is configured to receive a starting signal, and an output terminal of the starting transistor is electrically connected to a control terminal of the first output transistor. An input terminal of the first output transistor is electrically connected to a first power supply terminal, and an output terminal of the first output transistor is electrically connected to a first output terminal of a current stage gate driving circuit. In a writing frame of the display panel, the clock signal includes a plurality of transitions between an active level state and an inactive level state. In a plurality of holding frames of the display panel, the clock signal includes a plurality of first periods holding the inactive level state, and the clock signal includes the plurality of transitions between the active level state and the inactive level state in a second period between two adjacent first periods.

The embodiments of the present disclosure further provide a display panel including the gate driving unit mentioned above and a plurality of sub-pixels. Each of the sub-pixels includes a light-emitting device and a pixel driving circuit. The pixel driving circuit includes a driving transistor and a data transistor. The driving transistor is configured to generate a driving current for driving the light-emitting device to emit light according to a corresponding data signal. An input terminal of the data transistor is configured to receive the data signal. An output terminal of the data transistor is electrically connected to an input terminal of the driving transistor. The plurality of gate driving circuits are configured to generate the plurality of gate controlling signals for output to the control terminal of the data transistor of the plurality of sub-pixels. In the writing frame, data transistors of the plurality of sub-pixels transmit the data signal to the input terminal of the driving transistor according to the corresponding gate controlling signals. In the holding frame, the data transistors of the plurality of the sub-pixels are turned off according to the corresponding gate controlling signals.

DETAILED DESCRIPTION

To make the objectives, technical solutions, and effects of the present disclosure more clear and specific, the present disclosure is described in further detail below with reference to the embodiments accompanying with drawings. It should be understood that the specific embodiments described herein are merely for explaining the present disclosure, and the present disclosure is not limited thereto.

The embodiment of the present disclosure provides a gate driving unit and a display panel. In a writing frame of the display panel, a clock signal includes a plurality of transitions between an active level state and an inactive level state, so that all gate controlling signals outputted by a plurality of gate driving circuits have effective pulses. In a plurality of holding frames of the display panel, the clock signal includes a plurality of first periods holding the inactive level state to save power consumption. By controlling the clock signal to have the plurality of transitions between the active level state and the inactive level state in a second period between two adjacent first periods, a problem that a first output transistor cannot be completely turned on due to a potential change at the control terminal of the first output transistor, resulting in an abnormality of gate controlling signals output by the gate driving circuits, is improved.

Figure 1:
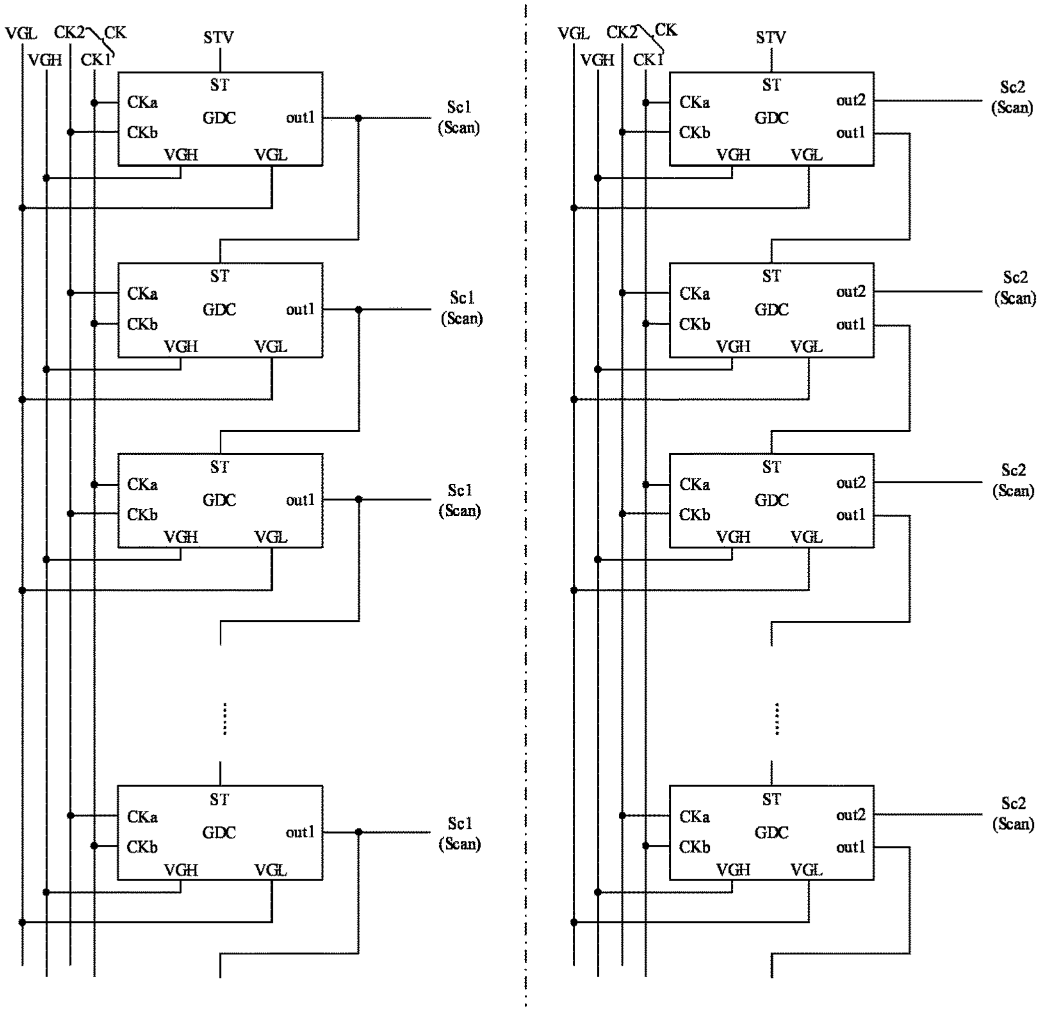
FIG. 1 is a schematic diagram of a gate driving unit provided by an embodiment of the present disclosure.

Specifically, FIG. 1 is a schematic diagram of a gate driving unit provided by an embodiment of the present disclosure. The present disclosure provides a gate driving unit. The gate driving unit includes a plurality of gate driving circuits GDC configured to output a plurality of gate controlling signals Scan to a plurality of sub-pixels of a display panel.

FIGS. 2A-2D are circuit diagrams of the gate driving unit provided by an embodiment of the present disclosure. Each of the plurality of gate driving circuits at least includes a starting transistor Ts and a first output transistor Tto1.

A control terminal of the starting transistor Ts is configured to receive a corresponding clock signal CK. An input terminal of the starting transistor Ts is configured to receive a starting signal ST. An output terminal of the starting transistor Ts is electrically connected to a control terminal of the first output transistor Tto1.

The multistage gate driving circuits cascaded behind the first stage gate driving circuit can receive a first controlling signal Sc1 output from a first output terminal out1 by the gate driving circuit of a previous stage as the starting signal ST. The first stage gate driving circuit of the multistage gate driving circuits can receive a controlling signal STV generated by a timing controller or the like as the starting signal ST.

Optionally, the n-th stage driving circuit GDC(n) receives the first control signal Sc1(*n*-A) output from the first output terminal out1(*n*-A) by the (n-A)-th stage gate driving circuit GDC(n-A) as the starting signal ST. Where A is greater than or equal to 1. For example, the multistage gate driving circuits GDC adopt a design of line-by-line cascaded, the n-th stage gate driving circuit GDC(n) receives a first control signal Sc1(*n*−1) output from a first output terminal out1 (n−1) of the (n−1)-th stage gate driving circuit GDC(n−1) as the starting signal ST.

An input terminal of the first output transistor Tto1 is electrically connected to a first power supply terminal VGL. An output terminal of the first output transistor Tto1 is electrically connected to the first output terminal out1 of the current stage gate driving circuit GDC.

Optionally, in some embodiments, if transistors applied to the gate driving circuits GDC in the display panel and used to output the gate controlling signal Scan are P-type transistors, the input terminal of the first output transistor Tto1 may also be electrically connected to a second power supply terminal VGH. Optionally, a voltage of the second power supply terminal VGH is greater than a voltage of the first power supply terminal VGL.

Referring to FIGS. 2A-2D, each of the gate driving circuits GDC further includes a first transistor T1, a second transistor T2, a third transistor T3, a fourth transistor T4, a fifth transistor T5, a sixth transistor T6, a seventh transistor T7, a second output transistor Tto2, a first capacitor C1, a second capacitor C2, and a third capacitor C3.

A control terminal of the first transistor T1 is electrically connected to the control terminal of the starting transistor Ts. An input terminal of the first transistor T1 is electrically connected to the first power supply terminal VGL.

A control terminal of the second transistor T2 is electrically connected to the output terminal of the starting transistor Ts. An input terminal of the second transistor T2 is electrically connected to the control terminal of the starting transistor Ts. The output terminal of the second transistor T2 is electrically connected to an output terminal of the first transistor T1.

A control terminal of the third transistor T3 is electrically connected to the output terminal of the first transistor T1.

A control terminal of the fourth transistor T4 is electrically connected to an input terminal of the third transistor T3. An input terminal of the fourth transistor T4 is electrically connected to an output terminal of the third transistor T3.

A control terminal of the fifth transistor T5 is electrically connected to the output terminal of the starting transistor Ts. An input terminal of the fifth transistor T5 is electrically connected to a second power supply terminal VGH. An output terminal of the fifth transistor T5 is electrically connected to an output terminal of the fourth transistor T4.

A control terminal of the sixth transistor T6 is electrically connected to the output terminal of the first transistor T1. An input terminal of the sixth transistor T6 is electrically connected to the second power supply terminal VGH.

An input terminal of the seventh transistor T7 is electrically connected to an input terminal of the third transistor T3. An output terminal of the seventh transistor T7 is electrically connected to an output terminal of the sixth transistor T6.

Figure 2A:
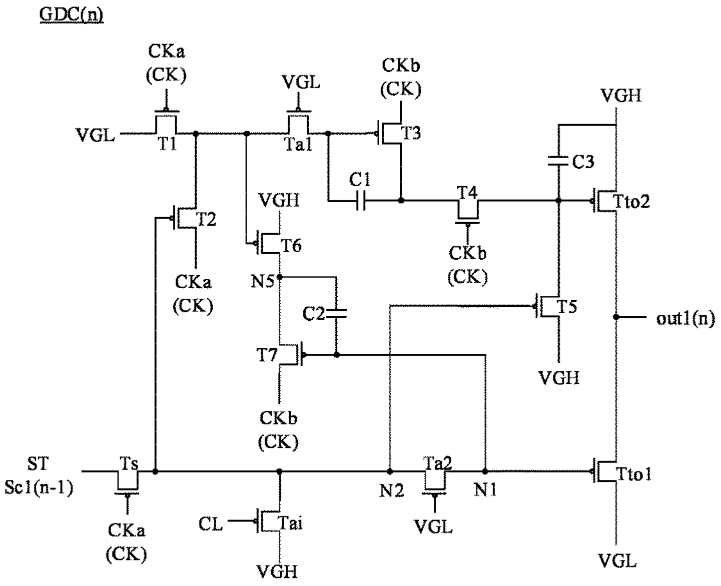
FIGS. 2A-2D are circuit diagrams of the gate driving unit provided by an embodiment of the present disclosure.

Optionally, as shown in FIG. 2A, the control terminal of the seventh transistor T7 is electrically connected to the control terminal of the first output transistor Tto1.

Referring to FIGS. 2A-2D, a control terminal of the second output transistor Tto2 is electrically connected to the output terminal of the fourth transistor T4. An input terminal of the second output transistor Tto2 is electrically connected to the second power supply terminal VGH. An output terminal of the second output transistor Tto2 is electrically connected to the output terminal of the first output transistor Tto1.

Optionally, in some embodiments, the input terminal of the first output transistor Tto1 is electrically connected to the second power supply terminal VGH. The input terminal of the second output transistor Tto2 is electrically connected to the first power supply terminal VGL.

Referring to FIGS. 2A-2D, a first terminal of the first capacitor C1 is electrically connected to the control terminal of the third transistor T3. A second terminal of the first capacitor C1 is electrically connected to the output terminal of the third transistor T3.

A first terminal of the second capacitor C2 is electrically connected to the control terminal of the seventh transistor T7. A second terminal of the second capacitor C2 is electrically connected to the output terminal of the seventh transistor T7.

A first terminal of the third capacitor C3 is electrically connected to the control terminal of the second output transistor Tto2. A second terminal of the third capacitor C3 is electrically connected to the input terminal of the second output transistor Tto2.

Optionally, referring to FIG. 1 and FIGS. 2A-2D, the clock signal CK includes a first clock signal CK1 and a second clock signal CK2. The control terminal of the starting transistor Ts is configured to receive one of the first clock signal CK1 and the second clock signal CK2, and the control terminal of the fourth transistor T4 is configured to receive another one of the first clock signal CK1 and the second clock signal CK2. In FIG. 1, CKa corresponds to the control terminal of the starting transistor Ts, and CKb corresponds to the control terminal of the fourth transistor T4.

Optionally, in one of the adjacent two-stage gate driving circuits GDC, the control terminal of the starting transistor Ts is configured to receive the first clock signal CK1, and the control terminal of the fourth transistor T4 is configured to receive the second clock signal CK2. In another one of the adjacent two-stage gate driving circuits GDC, the control terminal of the starting transistor Ts is configured to receive the second clock signal CK2, and the control terminal of the fourth transistor T4 is configured to receive the first clock signal CK1.

Optionally, the control terminal of the starting transistor Ts of odd-numbered stage gate driving circuits GDC is configured to receive the first clock signal CK1, and the control terminal of the starting transistor Ts of even-numbered stage gate driving circuits GDC is configured to receive the second clock signal CK2. The control terminal of the fourth transistor T4 of the odd-numbered stage gate driving circuits GDC is configured to receive the second clock signal CK2, and the control terminal of the fourth transistor T4 of the even-numbered stage gate driving circuits GDC is configured to receive the first clock signal CK1.

Optionally, referring to FIGS. 2A-2D, each of the gate driving circuits GDC further includes a first shield transistor Ta1 and a second shield transistor Ta2.

An input terminal of the first shielding transistor Ta1 is electrically connected to the output terminal of the first transistor T1. An output terminal of the first shielding transistor Ta1 is electrically connected to the control terminal of the third transistor T3.

An input terminal of the second shielding transistor Ta2 is electrically connected to the output terminal of the starting transistor Ts. An output terminal of the second shielding transistor Ta2 is electrically connected to the control terminal of the first output transistor Tto1.

Optionally, the first shielding transistor Ta1 and the second shielding transistor Ta2 are P-type transistors. A control terminal of the first shielding transistor Ta1 is electrically connected to the first power supply terminal VGL, and a control terminal of the second shielding transistor Ta2 is electrically connected to the first power supply terminal VGL. The first shielding transistor Ta1 and the second shielding transistor Ta2 are N-type transistors. The control terminal of the first shielding transistor Ta1 and the control terminal of the second shielding transistor Ta2 are electrically connected to the second power supply terminal VGH.

Figure 2B:
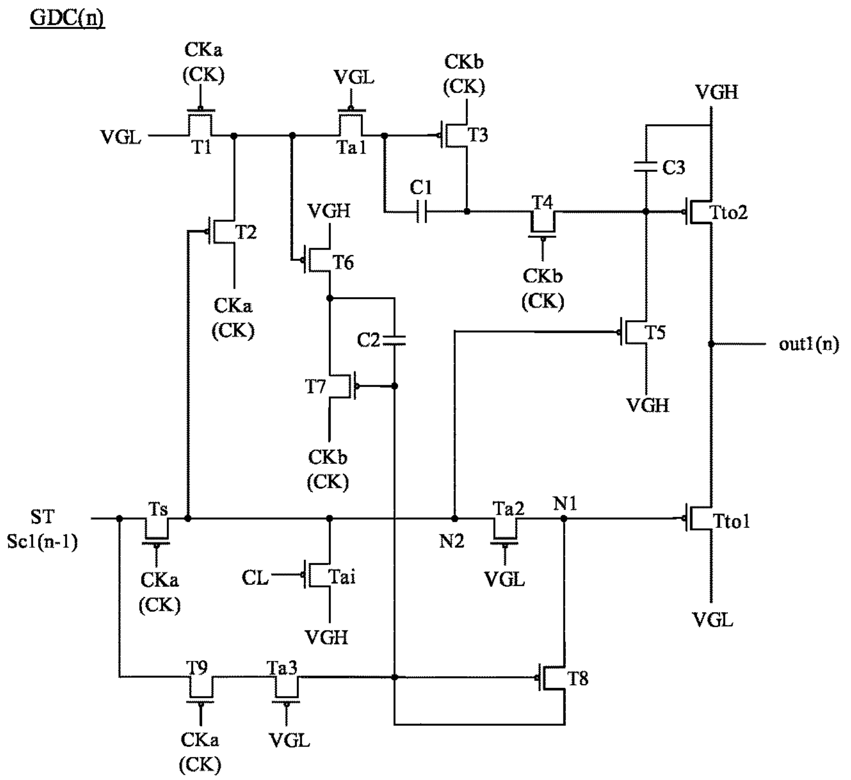
Figure 2C:
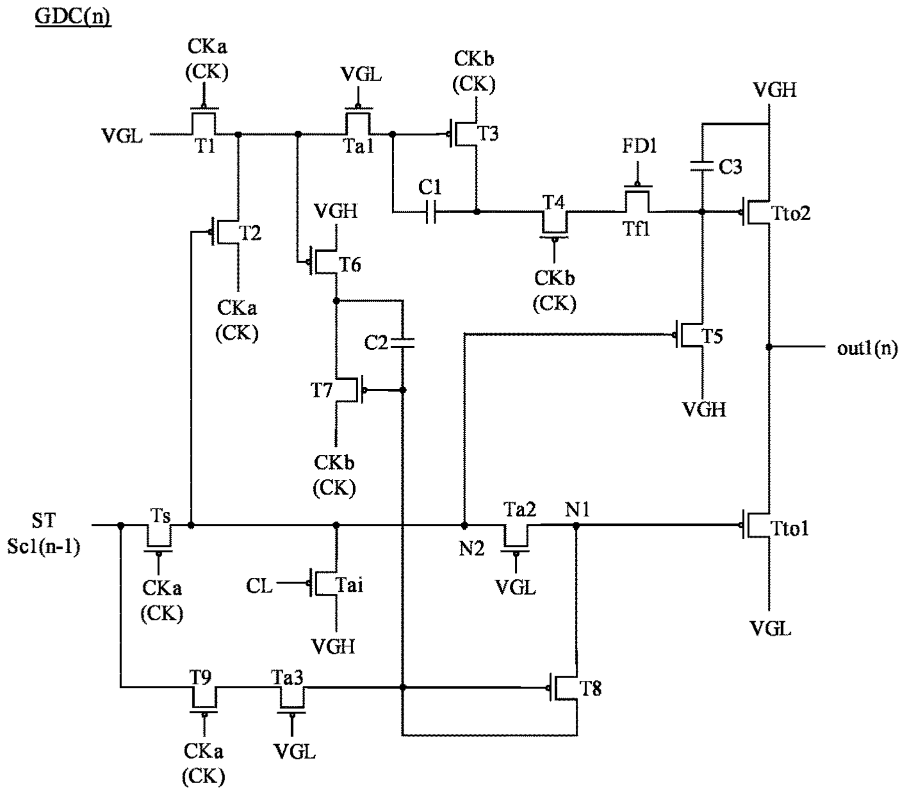
Figure 2D:
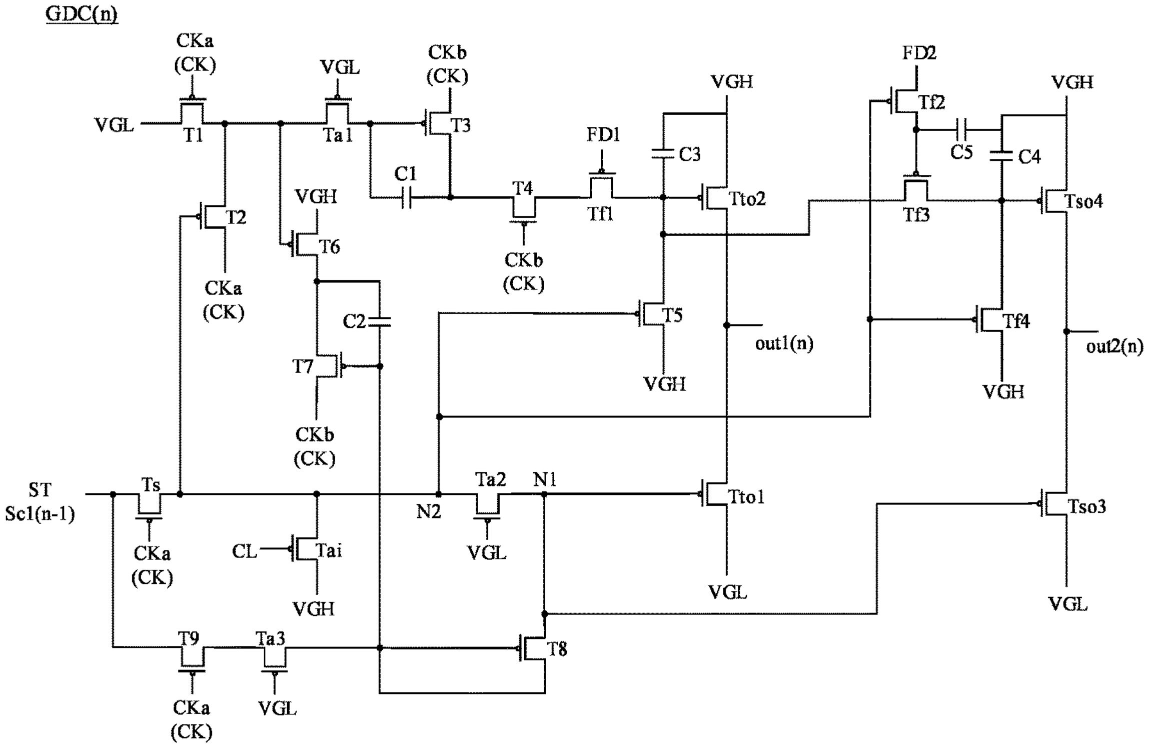

Optionally, referring to FIGS. 2B-2D, each of the gate driving circuits GDC further includes an eighth transistor T8 and a ninth transistor T9.

A control terminal of the eighth transistor T8 and an input terminal of the eighth transistor T8 are electrically connected to a control terminal of the seventh transistor T7. An output terminal of the eighth transistor T8 is electrically connected to the control terminal of the first output transistor Tto1.

A control terminal of the ninth transistor T9 is electrically connected to the control terminal of the starting transistor Ts. An input terminal of the ninth transistor T9 is electrically connected to the input terminal of the starting transistor Ts. An output terminal of the ninth transistor T9 is electrically connected to the control terminal of the seventh transistor T7.

Optionally, referring to FIGS. 2B-2D, each of the gate driving circuits GDC further includes a third shielding transistor Ta3. An input terminal of the third shielding transistor Ta3 is electrically connected to the output terminal of the ninth transistor T9, and an output terminal of the third shielding transistor Ta3 is electrically connected to the control terminal of the eighth transistor T8. Optionally, the third shielding transistor Ta3 is a P-type transistor. A control terminal of the third shielding transistor Ta3 is electrically connected to the first power supply terminal VGL. The third shielding transistor Ta3 is an N-type transistor. The control terminal of the third shielding transistor Ta3 is electrically connected to the second power supply terminal VGH.

Optionally, referring to FIGS. 2A-2D, each of the gate driving circuits GDC further includes a tenth transistor Tai. A control terminal of the tenth transistor Tai is electrically connected to a power-on reset control line CL. An input terminal of the tenth transistor Tai is electrically connected to the second power supply terminal VGH. An output of the tenth transistor Tai is electrically connected to the control terminal of the first output transistor Tto1.

Optionally, referring to FIGS. 2C-2D, each of the gate driving circuits GDC further includes a first frequency-dividing transistor Tf1. A control terminal of the first frequency-dividing transistor Tf1 is electrically connected to a first frequency-dividing control line for transmitting a first frequency-dividing control signal FD1. An input terminal of the first frequency-dividing transistor Tf1 is electrically connected to the output terminal of the fourth transistor T4. An output terminal of the first frequency-dividing transistor Tf1 is electrically connected to the control terminal of the second output transistor Tto2.

Optionally, referring to FIG. 2D, each of the gate driving circuits GDC further includes a second frequency-dividing transistor Tf2, a third frequency-dividing transistor Tf3, a fourth frequency-dividing transistor Tf4, a third output transistor Tto3, a fourth output transistor Tto4, and a fourth capacitor C4.

A control terminal of the second frequency-dividing transistor Tf2 is electrically connected to the output terminal of the starting transistor Ts. An input terminal of the second frequency-dividing transistor Tf2 is electrically connected to a second frequency-dividing control line for transmitting a second frequency-dividing control signal FD2.

A control terminal of the third frequency-dividing transistor Tf3 is electrically connected to an output terminal of the second frequency-dividing transistor Tf2. An input terminal of the third frequency-dividing transistor Tf3 is electrically connected to the control terminal of the control terminal of the second output transistor Tto2.

A control terminal of the fourth frequency-dividing transistor Tf4 is electrically connected to the control terminal of the second frequency-dividing transistor Tf2. An input terminal of the fourth frequency-dividing transistor Tf4 is electrically connected to the second power supply terminal VGH. An output terminal of the fourth frequency-dividing transistor Tf4 is electrically connected to an output terminal of the third frequency-dividing transistor Tf3.

A control terminal of the third output transistor Tto3 is electrically connected to the control terminal of the first output transistor Tto1. An input terminal of the third output transistor Tto3 is electrically connected to the first power supply terminal VGL. An output terminal of the third output transistor Tto3 is electrically connected to a second output terminal out2 of the current stage gate driving circuit GDC.

A control terminal of the fourth output transistor Tto4 is electrically connected to the output terminal of the third frequency-dividing transistor Tf3. An input terminal of the fourth output transistor Tto4 is electrically connected to the second power supply terminal VGH. An output terminal of the fourth output transistor Tto4 is electrically connected to the output terminal of the third output transistor Tto3.

Optionally, in some embodiments, the input terminal of the third output transistor Tto3 is electrically connected to the second power supply terminal VGH. The input terminal of the fourth output transistor Tto4 is electrically connected to the first power supply terminal VGL.

A first terminal of the fourth capacitor C4 is electrically connected to the input terminal of the fourth output transistor Tto4. A second terminal of the fourth capacitor C4 is electrically connected to the control terminal of the fourth output transistor Tto4.

Optionally, referring to FIG. 2D, each of the gate driving circuits GDC further includes a fifth capacitor C5. A first terminal of the fifth capacitor C5 is electrically connected to the output terminal of the second frequency-dividing transistor Tf2. A second terminal of the fifth capacitor C5 is electrically connected to the input terminal of the fourth output transistor Tto4.

Figure 3:
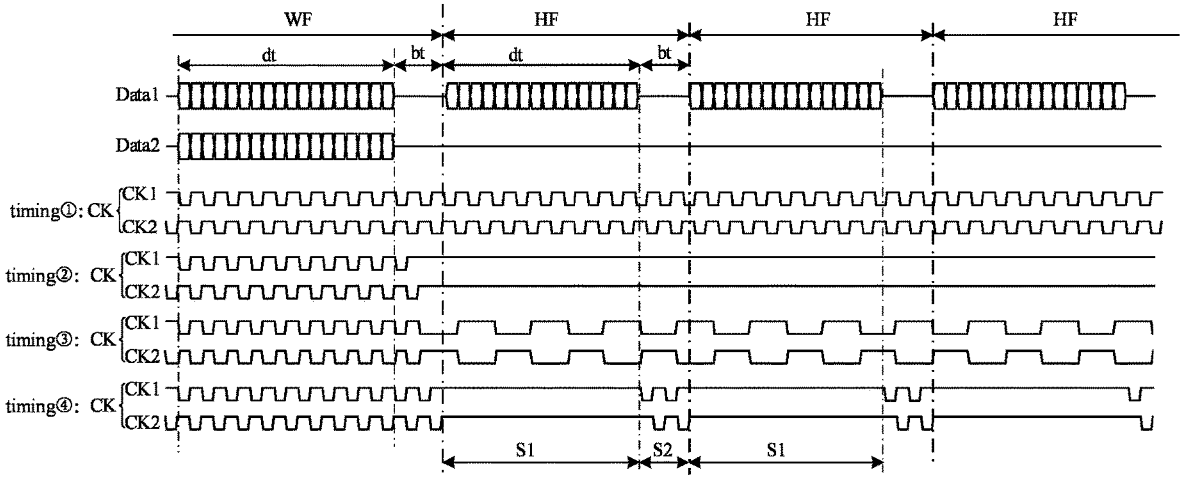
FIG. 3 is a timing diagram of clock signals provided by an embodiment of the present disclosure.

FIG. 3 is a timing diagram of clock signals provided by an embodiment of the present disclosure. Data1 indicates that when the display panel operates at a high refresh frequency (e.g. the refresh frequency is greater than or equal to 120 Hz), each frame corresponds to a data signal used by the writing frame WF. Data2 indicates a data signal used when the display panel uses a low refresh frequency (e.g. the refresh frequency is less than 120 Hz) for display.

When the display panel operates at a low refresh frequency (e.g. the refresh frequency is less than 120 Hz), the display panel includes at least one frame corresponding to the holding frame HF in addition to the writing frame WF in a display period corresponding to the same picture. In the writing frame WF, the display panel operates according to a received data signal. In the holding frame HF, the display panel operates according to the data signal received in the writing frame WF of the same display period. Therefore, within a duration corresponding to the holding frame HF, if the clock signal CK still maintains the transitions between the active level state and the inactive level state at the same frequency as the writing frame WF (as shown in timing ① in FIG. 3), the display panel to which the gate driving unit is applied will have a large power consumption.

Therefore, the clock signal CK applied by the gate driving unit may include a first period S1 for holding the inactive level state in the holding frame HF of the display panel, so as to reduce the power consumption of the display panel to which the gate driving unit is applied. Take the example that the starting transistor Ts and the fourth transistor T4 are both P-type transistors as an example, the clock signal CK may include the first period S1 holding a high level state in the holding frame HF, so that the starting transistor Ts and the fourth transistor T4 may be turned off in the holding frame HF. Correspondingly, when the clock signal CK includes the active level state, the starting transistor Ts is turned on.

It may be understood that the display panel may include a plurality of holding frames HF of the display period when the display panel operates at a low refresh frequency.

Optionally, the clock signal CK includes at least one first period S1 holding the active level state in the plurality of holding frames HF of the display panel to reduce the power consumption of the display panel to which the gate driving unit is applied.

Optionally, as shown in timing ② in FIG. 3, the clock signal CK includes one first period S1 holding the inactive level state, and a duration corresponding to the first period S1 is equal to a sum of durations of all the holding frames HF of the display period, so as to reduce the power consumption of the display panel to the greatest extent possible.

Optionally, when the display panel operates at the low frequency, the refresh frequency of the display panel may be equal to 90 Hz, 60 Hz, 30 Hz, 10 Hz, 1 Hz, etc. Optionally, when the display panel operates at the low frequency, the refresh frequency of the display panel may be less than 1 Hz.

The smaller the refresh frequency of the display panel, the longer the clock signal CK remains in the inactive level state, and the more prone to problems in the reliability of the display panel. Take the example that the display panel applies a frequency of 120 Hz as the high refresh frequency and a frequency of 1 Hz as the low refresh frequency. When the refresh frequency applied to the display panel is 1 Hz, the writing frame WF corresponds to 1 frame, and the holding frame HF corresponds to 119 frames. Accordingly, the clock signal CK needs to keep the inactive level state continuously for 119 frames, and during this time, some transistors of the gate driving circuit GDC (such as the starting transistor Ts) are subjected to a bias voltage for a long time, resulting in a threshold voltage drift, which in turn increases leakage currents of the transistors, the gate controlling signals Scan output by the gate driving circuit GDC deviates from expectations, leading to reliability problems in the display panel to which the gate driving unit is applied.

Therefore, as shown in timing ③ in FIG. 3, a transition frequency of the clock signal CK between the active level state and the inactive level state corresponding to at least one holding frame HF is less than a transition frequency of the clock signal CK between the active level state and the inactive level state of the writing frame WF in the same display period, so as to reduce the power consumption of the display panel and a probability of the reliability problems.

Optionally, the transition frequency of the clock signal CK between the active level state and the inactive level state corresponding to different holding frames HF in the same display period may be different or the same.

However, due to the transitions of the clock signal CK between the active level state and the inactive level state corresponding to the holding frames HF, some transistors of each stage gate driving circuits GDC the gate driving unit continuously undergo cycles of turned-on and turned-off states. Some transistors of the multistage gate driving circuits GDC undergo the same cycles of the turned-on and turned-off states, resulting in higher power consumption of the display panel to which the gate driving unit is applied. Take the control terminal of the starting transistor Ts of the odd-numbered stage gate driving circuits receives the first clock signal CK1, the control terminal of the fourth transistor T4 of the odd-numbered stage gate driving circuits receives the second clock signal CK2, the control terminal of the starting transistor Ts of the even-numbered stage gate driving circuits receives the second clock signal CK2, and the control terminal of the fourth transistor T4 of the gate driving circuits of the even-numbered stage receives the first clock signal CK1 as examples. In each of the holding frames HF, when the first clock signal CK1 includes the active level state, the second clock signal CK2 includes the inactive level state, the starting transistors Ts of the odd-numbered stage gate driving circuits GDC are simultaneously turned on, and the fourth transistor T4 of the even-numbered stage gate driving circuits GDC are simultaneously turned on. When the first clock signal CK1 includes the inactive level state, and the second clock signal CK2 includes the active level state, the starting transistors Ts of the even-numbered stage gate driving circuits GDC are simultaneously turned on, and the fourth transistor T4 of the odd-numbered gate driving circuit GDC is simultaneously turned on. Therefore, in the holding frames HF, the first clock signal CK1 has a plurality of transitions between the active level state and the inactive level state, and correspondingly, the second clock signal CK2 also has a plurality of transitions between the inactive level state and the active level state, so that transistors, such as the starting transistor Ts and the fourth transistor T4, of the multistage gate driving circuits GDC continuously undergo the cycles of the turned-on and turned-off states, and a large number of transistors are turned on at the same period, resulting in larger power consumption of the display panel.

In addition, influenced by characteristics of the transistors, the leakage currents of the transistors increases in high temperature (such as 85° C.) environments, resulting in charge loss at key nodes of the gate driving circuits (such as a first node N1 corresponding to the control terminal of the first output transistor Tto1), resulting in a potential change, the first control signal Sc1 output by the gate driving circuits GDC is abnormal, and the display effect of the display panel is affected. For the gate driving circuit GDC shown in FIG. 2D, the potential change at the first node N1 also causes the second control signal Sc2 output by the gate driving circuit GDC to be abnormal.

Figure 4A:
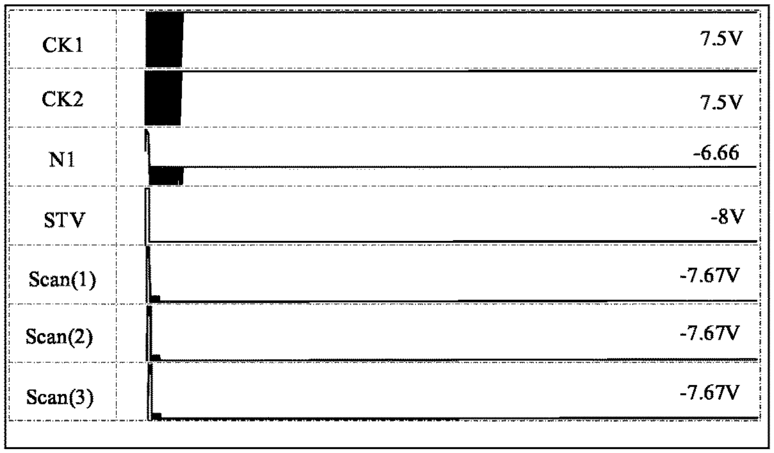
FIG. 4A is a simulation timing diagram of the gate driving circuit shown in FIG. 2A.
Figure 4B:
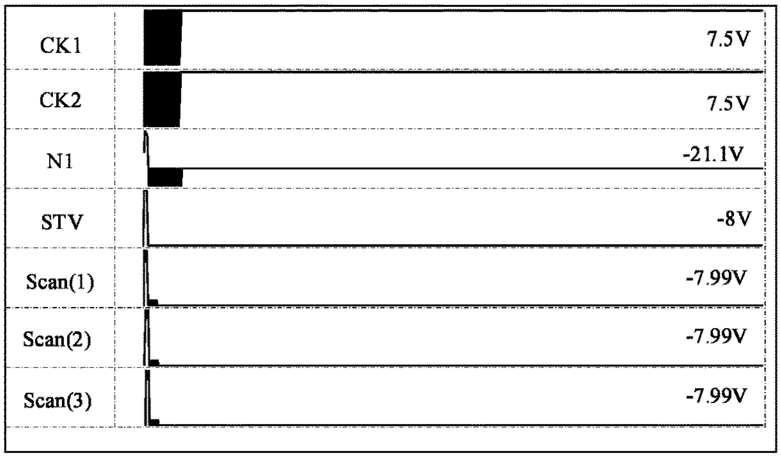
FIG. 4B is a simulation timing diagram of the gate driving circuit shown in FIG. 2B.
Figure 4C:
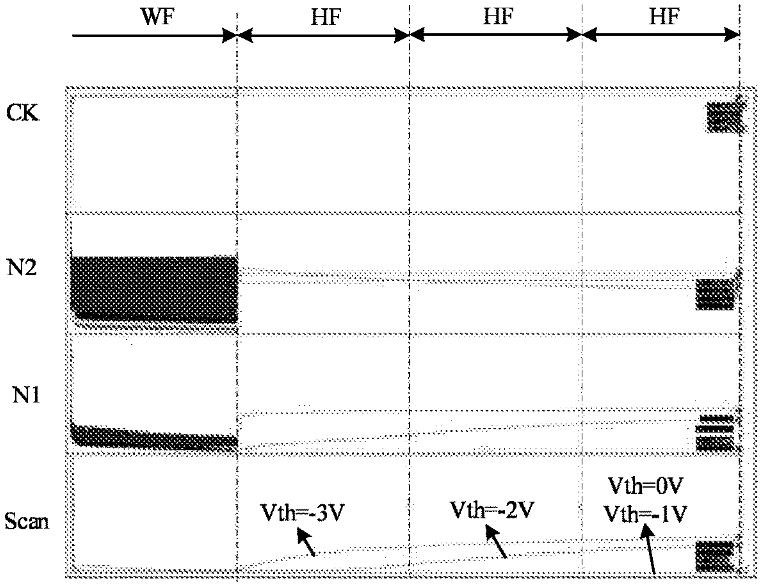
FIG. 4C is a diagram showing a relationship between threshold voltages and potentials at a first node provided by an embodiment of the present disclosure.

Compared with the gate driving circuit shown in FIG. 2A, the gate driving circuits GDC shown in FIGS. 2A to 2D provided by the present disclosure has better stability to the potential of the key nodes (such as the first node N1). FIG. 4A is a simulation timing diagram of the gate driving circuit shown in FIG. 2A. FIG. 4B is a simulation timing diagram of the gate driving circuit shown in FIG. 2B. FIG. 4C is a diagram showing a relationship between threshold voltages and potentials at a first node provided by an embodiment of the present disclosure. Scan(1) represents a gate controlling signal output by a first stage gate driving circuit GDC(1). Scan(2) represents a gate controlling signal output by a second stage gate driving circuit GDC(2). Scan(3) represents a gate controlling signal output by a third stage gate driving circuit GDC(3). The second node N2 corresponds to the output terminal of the starting transistor.

Inventors take the first output transistor Tto1 as the P-type transistor as an example to carry out simulation verification. The simulation results show that when the clock signal CK includes one first period S1 holding the inactive level state, and the duration of the first period S1 is equal to the sum of the durations of all the holding frames HF in the display period (as shown in timing ② in FIG. 3), the voltage of the first node N1 of the gate driving circuit GDC shown in FIG. 2A is about −6.66 V. Moreover, as shown in FIG. 4C, as the negative bias of the threshold voltage Vth of the transistor is larger, the voltage of the first node N1 is more affected by the threshold voltage of the transistor, resulting in the potential of the first node N1 rising faster, so that the first output transistor Tto1 cannot be completely turned on, the first power supply signal transmitted by the first power supply terminal VGL cannot be effectively transmitted to the first output terminal out1, and then a voltage value of the first control signal Sc1 output by the first output terminal out1 will gradually rise, which will seriously cause the first control signal Sc1 to fail to meet use requirements. When the clock signal CK has one first period S1 holding the inactive level state, and the duration of the first period S1 is equal to the sum of the durations of all holding frames HF in the display period (as shown in timing ② in FIG. 3), the voltage of the first node N1 of the gate driving circuit GDC shown in FIG. 2B can be stabilized at −21.1V, the first output transistor Tto1 can be completely turned on, and the first power supply signal can be effectively transmitted to the first output terminal out1.

Therefore, compared with the gate driving circuit shown in FIG. 2A, the gate driving circuits GDC shown in FIGS. 2B-2D can lower the potential of the first node N1. When the clock signal CK has one first period S1 holding the inactive level state, and the first period S1 corresponds to the sum of the durations of the plurality of holding frames HF in the display period, the gate driving circuits GDC shown in FIGS. 2B-2D can still make the potential of the first node N1 meet the requirements, so that the first power supply signal can be transmitted to the first output terminal out1 of the gate driving circuits GDC to realize the complete output of the first power supply signal.

However, in extreme environments such as high temperatures, the leakage currents of the transistors may increase by orders of magnitude, resulting in charge exchange at the first node N1 of the gate driving circuits GDC shown in FIGS. 2B-2D through the transistors, such as the eighth transistor T8 and the second shielding transistor Ta2, which increases the voltage of the first node N1, the first output transistor Tto1 is not completely turned on, the first power supply signal cannot be effectively transmitted to the first output terminal out1, and the voltage value of the first control signal Sc1 output from the first output terminal out1 gradually rises. For the gate driving circuit GDC shown in FIG. 2D, the voltage of the first node N1 rises, which results in the voltage value of the second control signal Sc2 output from the second output terminal out2 gradually rising.

Figure 4D:
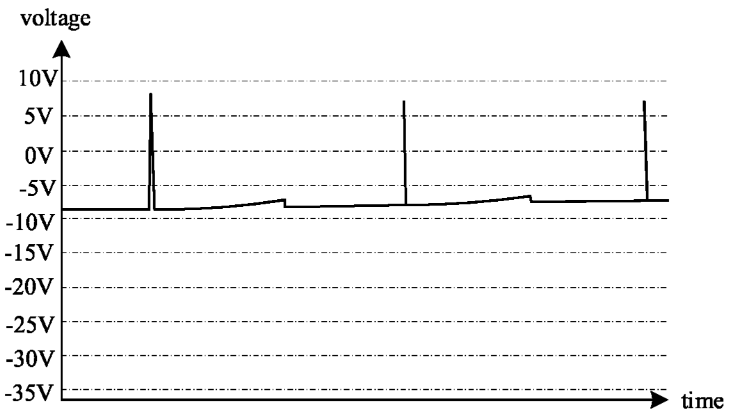
FIGS. 4D-4E are simulation timing diagrams of the gate driving circuit in an extreme environment provided by an embodiment of the present disclosure.
Figure 4E:
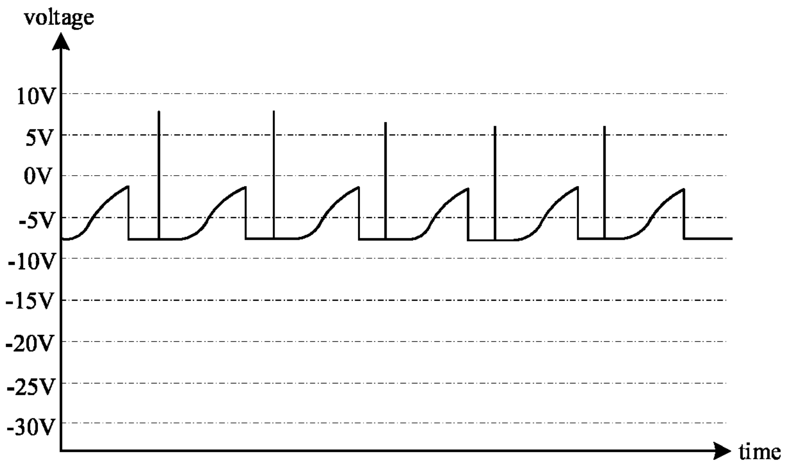

FIGS. 4D-4E are simulation timing diagrams of the gate driving circuit in extreme environments (such as high-temperature environments) provided by an embodiment of the present disclosure. From the simulation timing, it can be seen that in extreme environments such as high-temperature environments, the potential maintenance of the first node N1 is not as expected, so that the gate controlling signal Scan output by the gate driving circuit GDC is affected, and the gate controlling signal Scan appears peak and high-level state at the stage when it should be kept at a low level.

Therefore, the potentials of the key nodes of the gate driving circuit GDC can still meet the expected use requirements in extreme environments, such as high temperatures, to reduce power consumption. In the plurality of holding frames HF of the display panel, the clock signal CK has a plurality of first periods S1 holding the inactive level state, and the clock signal CK has the plurality of transitions between the active level state and the inactive level state in the second period S2 between two adjacent first periods S1, so as to refresh the potentials of the key nodes of the gate driving circuit GDC for a plurality of times through the change of the clock signal CK corresponding to the second period S2, thereby resetting the potentials of the key nodes in the gate driving circuit GDC back to an expected state, improving potential stability of the key nodes of the gate driving circuit GDC, and making the potentials of the key nodes meet the expected use requirements in extreme environments such as high temperatures while reducing the power consumption of the gate driving circuit GDC.

In the writing frame WF of the display panel, the clock signal CK includes the plurality of transitions between the active level state and the inactive level state, so that the multistage gate driving circuits GDC cooperates with effective pulses of the starting signal ST received by the starting transistor Ts of the first stage gate driving circuit GDC to generate a plurality of gate controlling signals Scan with effective pulses, which are output to the display panel, thereby assisting the display panel to realize functions such as writing data signals.

Optionally, each of the holding frames HF includes a display period dt and a vertical blanking period bt. The second period S2 at least corresponds to the vertical blanking period bt. In the vertical blanking period bt, the clock signal CK includes the plurality of transitions between the active level state and the inactive level state to refresh the potentials of the key nodes of the gate driving circuit GDC for the plurality of times, thereby resetting the potentials of the key nodes in the gate driving circuit GDC back to the expected state in the vertical blanking period bt. Furthermore, since a duration of the display period dt is longer than a duration of the vertical blanking period bt, the number of times that some transistors in the multistage gate driving circuits GDC switch between the turn-on state and the turn-off state according to the clock signal CK is reduced, and the number of times that the display panel simultaneously controls the turn-on state of the plurality of transistors is reduced. Compared with the design shown in timing ③ in FIG. 3, the design shown in the timing ④ in FIG. 3 of the present disclosure is more conducive to reducing the power consumption of the display panel.

Optionally, in the same vertical blanking stage bt, a number of the effective pulses of the clock signal CK is greater than or equal to 1. That is, in the same vertical blanking stage bt, the clock signal CK has at least one active level state. For example, in the vertical blanking stage bt, the number of the effective pulses of the clock signal CK is equal to 2, 5, 10, 12, etc.

Optionally, the writing frame WF also includes the display period dt and the vertical blanking period bt. In the vertical blanking period bt of the writing frame WF, the clock signal CK includes the plurality of transitions between the active level state and the inactive level state, so that the clock signal CK keeps a same changing rule in the writing frame WF to effectively complete the control of the data writing stage of next few rows of the sub-pixels Pi in the display panel, and make the writing frame WF have better display effect.

Optionally, the clock signal CK may also in the inactive level state in the vertical blanking period bt of the writing frame WF.

Optionally, at the same vertical blanking stage bt of the holding frame HF, the frequency of the clock signal CK is changeable, so that the durations for which the clock signal CK has an effective level state are different each time. That is, in the vertical blanking stage bt of the holding frame HF, when the clock signal CK has the plurality of transitions between the active level state and the inactive level state, the durations for which at least two active level states are maintained may be different.

Optionally, after experiencing the holding frame HF for one frame, the accumulation of potential offsets at the key nodes leads to significant potential offsets at the key nodes. In order to effectively and quickly reset the potentials of the key nodes to the expected state, in the same vertical blanking stage bt of the holding frame HF, the frequency of the clock signal CK may gradually increase, so that a duration of a first inactive level state of the clock signal CK is longer than a duration of any one of the plurality of the inactive level states after the first inactive level state, so as to continuously receive corresponding control signals within the duration corresponding to the first inactive level state of the clock signal CK, and control the corresponding transistors to recover to an expected working state.

Taking the control terminal of the starting transistor Ts receives the first clock signal CK1 as an example, the duration of the first inactive level state of the first clock signal CK1 is longer than the duration of any other inactive level states in the same vertical blanking stage bt of the holding frame HF. In the duration of the first inactive level state of the first clock signal CK1, the starting transistor Ts is turned on, and the starting signal ST is in the active level state that can turn on the first output transistor Tto1, so that the potential of the first node N1 is reset by the starting signal ST, the first power supply signal can be effectively output to the first output terminal out1, leaving a time margin for the recovery of the potential of the first node N1 and the recovery of the first control signal Sc1 output from the first output terminal out1, and the potentials of the first node N1 and the first output terminal out1 can be effectively and quickly restored to expected.

Optionally, in the same vertical blanking stage bt of the holding frame HF, the frequency of the clock signal CK may also be kept the same to reduce controlling complexity.

Optionally, a number of switching between the active level state and the inactive level state of the vertical blanking stage bt of the clock signal CK corresponding to different holding frames HF can be the same or different. The durations of the active level states of the vertical blanking stage bt of the clock signal CK corresponding to different holding frames HF can be the same or different.

Optionally, in order to make the display effect of the display panel using the gate driving unit similar in each holding frame HF, the plurality of first periods S1 have equal durations, so that the clock signal CK corresponds to the plurality of transitions between the active level state and the inactive level state after experiencing a fixed duration, and the potentials of the key nodes in the gate driving circuit GDC is reset back to the expected state after experiencing the fixed duration.

Optionally, referring to FIG. 3, the first clock signal CK1 is inverted to the second clock signal CK2 in the writing frame WF, so that the gate controlling signal Scan output by the gate driving unit has the effective pulses in turn in the writing frame WF. In the holding frame HF, the first period S1 of the first clock signal CK1 holding the inactive level state overlaps the first period S1 of the second clock signal CK2 holding the inactive level state, and the second period S2 of the first clock signal CK1 overlaps the second period S2 of the second clock signal CK2, so that an operation state of the multistage gate driving circuits GDC tends to be consistent, some transistors of the multistage gate driving circuits GDC (such as the starting transistor Ts and the first transistor T1) in the corresponding first period S1 are in the turn-off state, thereby reducing the power consumption of the display panel. Some transistors (such as the starting transistor Ts and the first transistor T1) of the multistage gate driving circuits GDC (such as the odd-numbered gate driving circuits GDC and/or the even-numbered stage gate driving circuits GDC) corresponding the second period S2 are all in the turn-on state, so that the potentials of the key nodes (such as the first node N1) is reset back to the expected state.

Optionally, in order to reduce the requirements for driving the display panel and reduce the power consumption, the first clock signal CK1 is inverted to the second clock signal CK2 in the second period S2 of the first clock signal CK1, so that the potentials of the key nodes of the multistage gate driving circuits GDC are reset at different times.

Optionally, the first clock signal CK1 may be in phase with the second clock signal CK2 in the second period S2 of the first clock signal CK1.

Optionally, in the display stage dt of the holding frame HF, the clock signal CK may also have the second period S2 to reset the potentials of the key nodes of the gate driving circuit GDC in the display stage dt of the holding frame HF.

Referring to FIGS. 2A-2B, the first controlling signal Sc1 output by the first output terminal out1 can be transmitted to the display panel as the gate controlling signal Scan. In the gate driving circuit GDC shown in FIG. 2C, although the gate driving circuit GDC can be used to realize a function that the display panel has different refresh frequencies corresponding to different display areas, the first control signal Sc1 output by the first output terminal out1 of the gate driving circuit GDC is transmitted to the display panel as a gate controlling signal Scan. In the gate driving unit shown in FIGS. 2A-2C, the first control signal Sc1 outputted from the first output terminal out1 of a current stage gate driving circuit GDC can also be multiplexed into the starting signal ST of the gate driving circuit GDC of the next stage, so as to realize cascade transmission of the multistage gate driving circuits GDC.

In the gate driving circuit GDC shown in FIG. 2D, the gate driving circuit GDC can be used to realize the function that the display panel has different refresh frequencies corresponding to different display areas, the first control signal Sc1 output by the first output terminal out of the gate driving circuit GDC is used as the starting signal ST of the gate driving circuit GDC of the next stage to realize cascade transmission of the multistage gate driving circuits GDC. The second control signal Sc2 outputted from the second output terminal out2 of the gate driving circuit GDC is transmitted to the display panel as the gate controlling signal Scan.

Figure 5A:
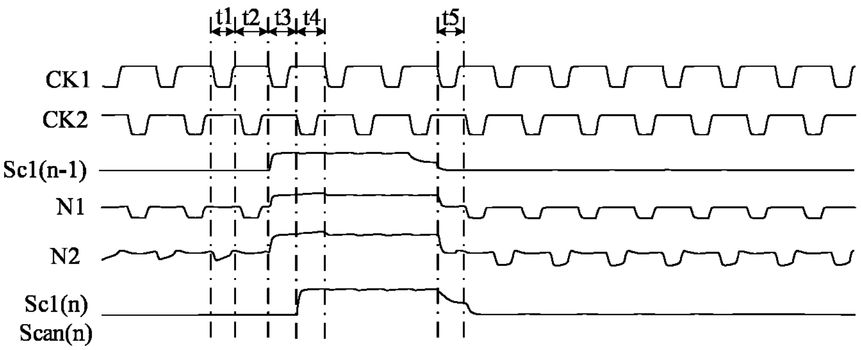
FIGS. 5A-5G are timing diagrams of corresponding gate driving circuits provided by an embodiment of the present disclosure.
Figure 5B:
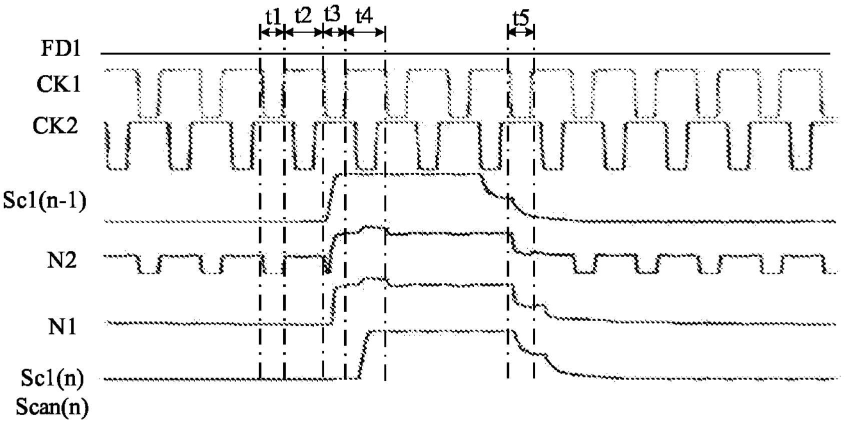
Figure 5C:
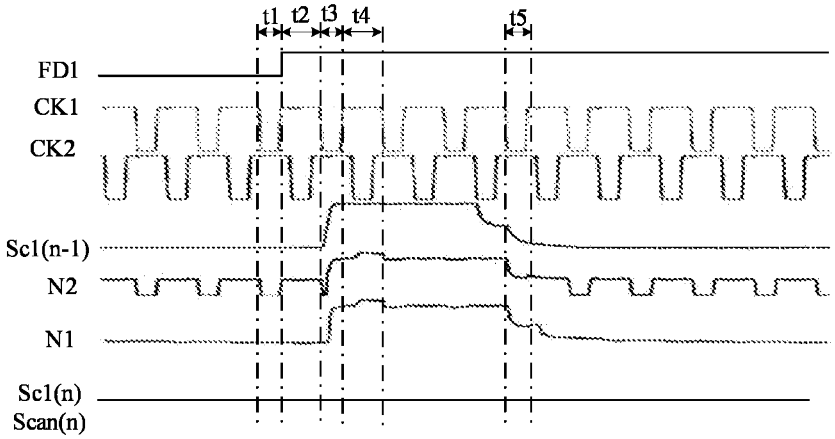
Figure 5D:
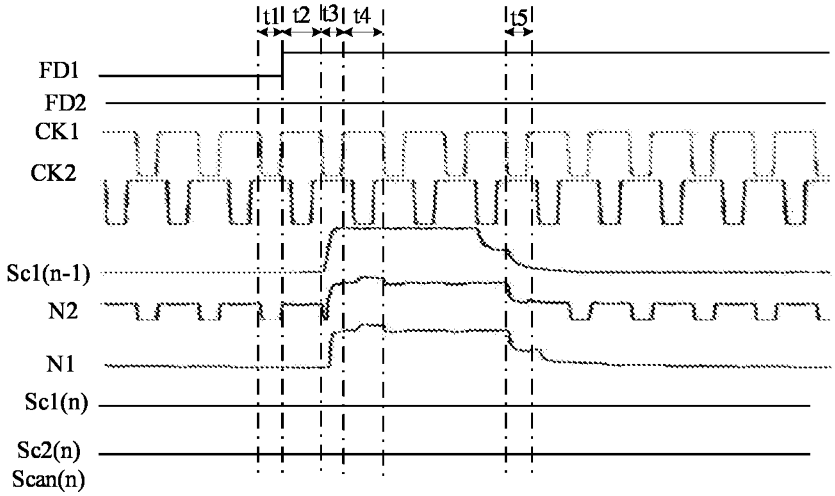
Figure 5E:
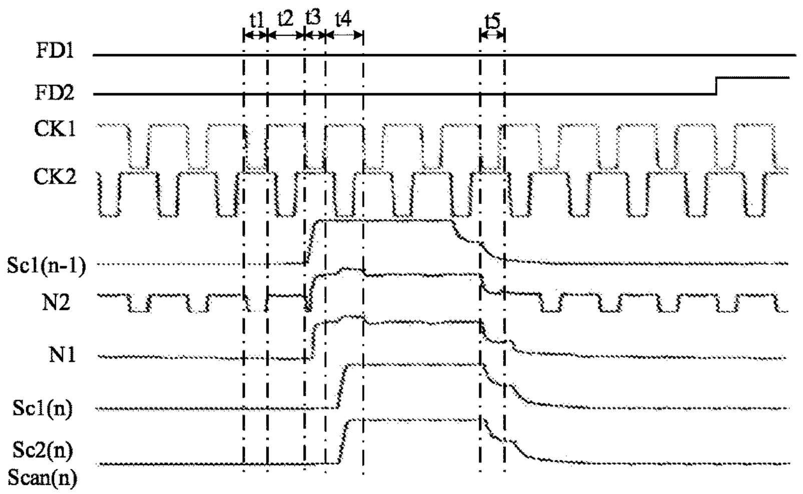
Figure 5F:
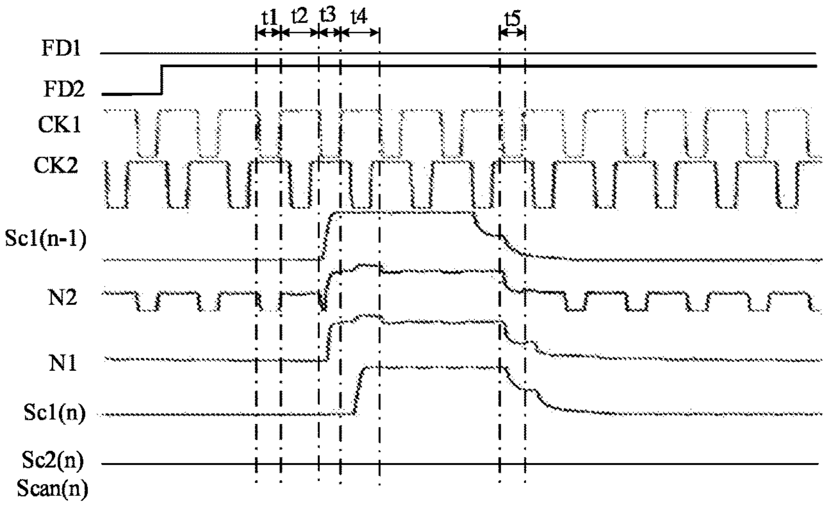

FIGS. 5A-5D are timing diagrams of corresponding gate driving circuits provided by an embodiment of the present disclosure. FIG. 5A is a timing diagram of the gate driving circuit shown in FIG. 2A. FIG. 5B is a timing diagram of the gate driving circuit shown in FIGS. 2B-2C. FIG. 5C is a timing diagram of the gate driving circuit shown in FIG. 2C. FIGS. 5D-5F are timing diagrams of the gate driving circuit shown in FIG. 2D.

An operating principle of the gate driving circuits GDC is explained by taking the transistors included in each gate driving circuit GDC as P-type, the transistors to which the gate controlling signal Scan is applied in the display panel as n-type, the first shielding transistor Ta1 and the second shielding transistor Ta2 are always kept in the turn-on state, the control terminal of the starting transistor Ts of the n-th gate driving circuit GDC(n) receives the first clock signal CK1, and the control terminal of the fourth transistor T4 receives the second clock signal CK2 as examples.

In a first operation period t1, the first clock signal CK1 is at a low level, the second clock signal CK2 is at a high level, and the starting signal ST, such as Sc1 (n−1), received by the n-th gate driving circuit GDC(n) is at a low level.

In the gate driving circuit GDC shown in FIG. 2A, the fourth transistor T4 of the n-th gate driving circuit GDC(n) is turned off, the first transistor T1 and the starting transistor Ts are turned on, and the starting signal ST received by the n-th gate driving circuit GDC(n) is transmitted to the first node N1. The second transistor T2, the fifth transistor T5, the seventh transistor T7, and the first output transistor Tto1 are turned on. The third transistor T3 and the sixth transistor T6 are turned on according to actions of the first power supply signal and the first clock signal CK1. The second clock signal CK2 is transmitted to one terminal of the first capacitor C1 electrically connected to the input terminal of the first capacitor C1 and the fourth transistor T4. The second power supply signal is transmitted to the output terminal of the sixth transistor T6 to charge the second capacitor C2. The second power supply signal is transmitted to the control terminal of the second output transistor Tto2, so that the second output transistor Tto2 is turned off. The second clock signal CK2 is transmitted to the output terminal of the sixth transistor T6. The first output transistor Tto1 is turned on, so that the first power supply signal is output to the first output terminal out1 of the n-th gate driving circuit GDC(n).

In the gate driving circuits GDC shown in FIGS. 2B-2C, the ninth transistor T9 and the eighth transistor T8 of the n-th gate driving circuit GDC(n) are also turned on.

In the gate driving circuit GDC shown in FIG. 2D, the third output transistor Tto3, the second frequency-dividing transistor Tf2, and the fourth frequency-dividing transistor Tf4 of the n-th gate driving circuit GDC(n) are also turned on. The first power supply signal is output to the second output terminal out2, and the fourth output transistor Tto4 is turned off.

In a second operation period t2, the first clock signal CK1 is at a high level, the second clock signal CK2 is at a low level, and the starting signal ST received by the n-th gate driving circuit GDC(n) is at a low level.

In the gate driving circuit GDC shown in FIG. 2A, the first transistor T1 and the starting transistor Ts of the n-th gate driving circuit GDC(n) are turned off, and the fourth transistor T4 is turned on. The second capacitor C2 maintains the second transistor T2, the fifth transistor T5, the seventh transistor T7, and the first output transistor Tto1 on. The third transistor T3 and the sixth transistor T6 are turned off according to the action of the second clock signal CK2. The second clock signal CK2 is coupled to the potential of the input terminal of the fourth transistor T4 through the first capacitor C1, and the second output transistor Tto2 is turned off. The second clock signal CK2 is coupled through the second capacitor C2, so that the potential at the first node N1 is further pulled down, the first output transistor Tto1 remains on, and the first power supply signal is output to the first output terminal out1 of the n-th gate driving circuit GDC(n) through the first output transistor Tto1.

In the gate driving circuits GDC shown in FIGS. 2B-2D, the ninth transistor T9 of the n-th gate driving circuit GDC(n) is turned off, and the second capacitor C2 further maintains the eighth transistor T8 on.

In the gate driving circuit GDC shown in FIG. 2D, the third output transistor Tto3, the second frequency-dividing transistor Tf2, and the fourth frequency-dividing transistor Tf4 of the n-th gate driving circuit GDC(n) remain on. The first power supply signal is output to the second output terminal out2, and the fourth output transistor Tto4 is turned off.

In the gate driving circuit GDC shown in FIG. 2D, if the third frequency-dividing transistor Tf3 of the n-th gate driving circuit GDC(n) is turned on according to the second frequency-dividing control signal FD2, the control terminal of the fourth output transistor Tto4 is electrically connected to the control terminal of the second output control transistor. If the third frequency-dividing transistor Tf3 of the n-th gate driving circuit GDC(n) is turned off according to the second frequency-dividing control signal FD2, the electrical connection between the control terminal of the fourth output transistor Tto4 and the control terminal of the second output control transistor is disconnected.

In a third operation period t3, the first clock signal CK1 is at a low level, the second clock signal CK2 is at a high level, and the starting signal ST received by the n-th gate driving circuit GDC(n) is at a high level.

In the gate driving circuit GDC shown in FIG. 2A, the fourth transistor T4 of the n-th gate driving circuit GDC(n) is turned off. The first transistor T1 and the starting transistor Ts are turned on. The starting signal ST received by the n-th gate driving circuit GDC(n) is transmitted to the first node N1. The second transistor T2, the fifth transistor T5, the sixth transistor T6, and the first output transistor Tto1 are turned off. The third transistor T3 and the sixth transistor T6 are turned on. The second clock signal CK2 is transmitted to the input terminal of the fourth transistor T4 through the third transistor T3. The second power supply signal charges the second capacitor C2 through the sixth transistor T6. The third capacitor C3 maintains the second output transistor Tto2 off. The gate controlling signal Scan(n) outputted by the n-th gate driving circuit GDC(n) maintains an output state of the previous period.

In the gate driving circuits GDC shown in FIGS. 2B-2D, the ninth transistor T9 of the n-th gate driving circuit GDC(n) is turned on, the starting signal ST is transmitted to the control terminal of the eighth transistor T8, and the eighth transistor T8 is turned off.

In the gate driving circuit GDC shown in FIG. 2D, the third output transistor Tto3, the second frequency-dividing transistor Tf2, and the fourth frequency-dividing transistor Tf4 of the gate driving circuit GDC(n) are turned off. The fourth output transistor Tto4 remains off. The third frequency-dividing transistor Tf3 remains in the same state as the second period S2.

In a fourth operation period t4, the first clock signal CK1 is at a high level, the second clock signal CK2 is at a low level, and the starting signal ST received by the n-th gate driving circuit GDC(n) is at a high level.

In the gate driving circuit GDC shown in FIG. 2A, the first transistor T1 and the starting transistor Ts of the n-th gate driving circuit GDC(n) are turned off. The fourth transistor T4 is turned on. The second capacitor C2 maintains the second transistor T2. The fifth transistor T5, the seventh transistor T7, and the first output transistor Tto1 off. The first capacitor C1 maintains the third transistor T3 on. The second clock signal CK2 is transmitted to the input terminal of the fourth transistor T4 through the third transistor T3. The potential of the control terminal of the third transistor T3 is coupled through the first capacitor C1 and pulled down to turn on the sixth transistor T6. The second power supply signal is coupled through the second capacitor C2 to raise the potential of the first node N1. The second output transistor Tto2 is turned on, and the second power supply signal is transmitted to the first output terminal out1 of the n-th gate driving circuit GDC(n).

In the gate driving circuits GDC shown in FIGS. 2B-2D, the ninth transistor T9 and the eighth transistor T8 of the n-th gate driving circuit GDC(n) are turned off.

In the gate driving circuit GDC shown in FIG. 2C, if the first frequency-dividing transistor Tf1 of the n-th gate driving circuit GDC(n) is turned off according to the first frequency-dividing control signal FD1, the second output transistor Tto2 remains off, and the gate controlling signal Scan(n) output from the first output terminal out1 remains in the same state as the third period, as shown in FIG. 5C, so that in the display panel to which the gate driving unit is applied, the transistors controlled by the gate controlling signal Scan(n) are turned off, and the purpose that the display panel has different refresh frequencies in different display areas is achieved. As shown in FIG. 5B, if the first frequency-dividing transistor Tf1 of the n-th gate driving circuit GDC(n) is turned on according to the first frequency-dividing control signal FD1, the second output transistor Tto2 is turned on, and the second power supply signal is transmitted to the first output terminal out1 of the n-th gate driving circuit GDC(n).

In the gate driving circuit GDC shown in FIG. 2D, the third output transistor Tto3, the second frequency-dividing transistor Tf2, and the fourth frequency-dividing transistor Tf4 of the n-th gate driving circuit GDC(n) are turned off, and the third frequency-dividing transistor Tf3 remains in the same state as the second period S2.

In the gate driving circuit GDC shown in FIG. 2D, if the first frequency-dividing transistor Tf1 of the n-th gate driving circuit GDC(n) is turned off, when the third frequency-dividing transistor Tf3 is turned on, the first control signal Sc1(*n*) output from the first output terminal out1 remains in the same state as the third period, so that the starting signal ST received by the gate driving circuit GDC cascaded after the n-th gate driving circuit GDC(n) has no effective pulse, and the gate driving circuit GDC of the subsequent stage has no control signal output for realizing cascade design. As shown in FIG. 5D, the second control signal Sc2 output from the second output terminal out2 remains in the same state as the third period, so that the gate controlling signal Scan(n) output from the second output terminal out2 by the gate driving circuit GDC has no effective pulse, the transistors controlled by the gate controlling signal Scan(n) are turned off, and the purpose that the display panel has different refresh frequencies in different display areas is achieved. When the third frequency-dividing transistor Tf3 is turned off, since the first frequency-dividing transistor Tf1 is turned off, the fourth output transistor Tto4 still remains off, so that the second control signal Sc2 output from the second output terminal out2 is kept in the same state as the third period, and the gate controlling signal Scan(n) output from the second output terminal out2 by the gate driving circuit GDC has no effective pulse, as shown in FIG. 5D, the transistors controlled by the gate controlling signal Scan(n) are turned off, and the purpose that the display panel has different refresh frequencies in different display areas is achieved. That is, regardless of whether the second frequency-dividing signal FD2 has the active level state in which the third frequency-dividing transistor Tf3 is turned on, or the inactive level state in which the third frequency-dividing transistor Tf3 is turned off, the fourth output transistor Tto4 cannot receive the corresponding control signal, because the first frequency-dividing transistor Tf1 is turned off, so that the gate controlling signal Scan(n) output from the second output terminal out2 has no effective pulse.

As shown in FIG. 5E, if the first frequency-dividing transistor Tf1 of the n-th gate driving circuit GDC(n) is turned on, when the third frequency-dividing transistor Tf3 is turned on, the second output transistor Tto2 is turned on, and the second power supply signal is transmitted to the first output terminal out1 of the n-th gate driving circuit GDC(n), so that the first control signal Sc1(*n*) output by the first output terminal out1 has the effective pulses, and the gate driving circuit GDC cascaded after the n-th gate driving circuit GDC(n) realizes a cascade design according to the first control signal Sc1(*n*) output by the n-th gate driving circuit GDC(n). The second power supply signal is transmitted to the second output terminal out2 of the n-th gate driving circuit GDC(n), so that the second control signal Sc2 outputted from the second output terminal out2 has the effective pulses. The transistor controlled by the gate controlling signal Scan(n) in the display panel is turned on, and the refresh frequency of the corresponding display area of the display panel is kept unchanged. When the third frequency-dividing transistor Tf3 is turned off, since the first frequency-dividing transistor Tf1 is turned on, the first control signal Sc1(*n*) outputted from the first output terminal out1 still has the effective pulses, as shown in FIG. 5F, so that the gate driving circuit GDC cascaded after the n-th gate driving circuit GDC(n) realizes a cascade design according to the first control signal Sc1(*n*) outputted from the n-th gate driving circuit GDC(n). Since the third frequency-dividing transistor Tf3 is turned off and the fourth output transistor Tto4 is still turned off, the second control signal Sc2 output from the second output terminal out2 is kept in the same state as the third stage, and the gate controlling signal Scan(n) output from the second output terminal out2 by the gate driving circuit GDC has no effective pulse, as shown in FIG. 5F, so that the transistors controlled by the gate controlling signal Scan(n) in the display panel is turned off, and the refresh frequency of the corresponding display area in the display panel starts to change, and the purpose of the display panel have different refresh frequencies in different display areas is achieved.

In a fifth operation period t5, the first clock signal CK1 is at a low level, the second clock signal CK2 is at a high level, and the starting signal ST received by the n-th gate driving circuit GDC(n) is at a low level.

In the gate driving circuit GDC shown in FIG. 2A, the fourth transistor T4 of the n-th gate driving circuit GDC(n) is turned off, the first transistor T1 and the starting transistor Ts are turned on, and the starting signal ST is transmitted to the first node N1. However, since the first node N1 is electrically connected to the second capacitor C2, when the first node N1 changes from a high potential to a low potential, influenced by a charging rate of the second capacitor C2, the potential of the first node N1 cannot reach a state in which the first output transistor Tto1 is completely turned on, the first output transistor Tto1 is partially turned on. The second transistor T2, the fifth transistor T5, and the seventh transistor T7 are turned on according to the signal of the second node N2. The third transistor T3 and the sixth transistor T6 are turned on according to a third voltage and the action of the first clock signal CK1. The second clock signal CK2 is transmitted to the input terminal of the fourth transistor T4 through the third transistor T3. The second power supply signal is transmitted to the output terminal of the sixth transistor T6. The second power supply signal is transmitted to the control terminal of the second output transistor Tto2. The second output transistor Tto2 is turned off. The seventh transistor T7 is turned on, so that the second clock signal CK2 is transmitted to the output terminal of the seventh transistor T7. The first output transistor Tto1 is turned on, so that the first power supply signal is output to the first output terminal out1 of the n-th gate driving circuit GDC(n). Influenced by the charging rate of the second capacitor C2, the first control signal Sc1 (n) output by the n-th gate driving circuit GDC(n) has a charging delay phenomenon.

In the gate driving circuit GDC shown in FIGS. 2B-2D, the eighth transistor T8 and the ninth transistor T9 of the n-th gate driving circuit GDC(n) are turned on, the charge at the first node N1 simultaneously flows out through the second shielding transistor Ta2 and the eighth transistor T8. Since the first node N1 is not directly connected to the second capacitor C2, the potential of the first node N1 drops faster than the gate driving circuit GDC shown in FIG. 2A, so that the first control signal Sc1(*n*) output from the first output terminal out1 shows a lower step voltage.

In the gate driving circuit GDC shown in FIG. 2D, the third output transistor Tto3, the second frequency-dividing transistor Tf2, and the fourth frequency-dividing transistor Tf4 of the n-th gate driving circuit GDC(n) are turned on, so that the first power supply signal is transmitted to the second output terminal out2, and the turn-on state of the third frequency-dividing transistor Tf3 is controlled by the second frequency-dividing control signal FD2. The second power supply signal is transmitted to the output terminal of the fourth transistor T4, so that the fourth output transistor Tto4 is turned off.

Therefore, by controlling the first frequency-dividing control signal FD1, a position of the display panel where the change of the refresh frequency begins to occur can be correspondingly controlled. If the sub-pixels Pi in the n-th row of the display panel receive the gate controlling signal Scan(n) output by the n-th gate driving circuit GDC(n) to realize the data signal writing operation, the first frequency-dividing transistor Tf1 of the n-th gate driving circuit GDC(n) controlled by the first frequency-dividing control signal FD1 is turned off, so that the gate controlling signal Scan(n) output by the n-th gate driving circuit GDC(n) has no effective pulse. Since the starting signal ST received by the multistage gate driving circuits GDC behind the n-th gate driving circuit GDC has no effective pulse, the gate controlling signal output by the multistage gate driving circuits GDC behind the n-th gate driving circuit GDC(n) also has no effective pulse, so that the sub-pixels Pi of the display panel before the n-th row can perform the data signal writing operation. The sub-pixels Pi located in and after the n-th row cannot perform the data signal writing operation according to the corresponding gate controlling signal Scan. Therefore, in the duration of one frame, the sub-pixels Pi located before the n-th row operate the writing frame WF, while the sub-pixels Pi located in and after the n-th row perform the operation of the holding frames HF. Accordingly, in the display period, the refresh frequency corresponding to the sub-pixels Pi located before the n-th row is different from that of the sub-pixels Pi located after the n-th row, so that the display panel can achieve the purpose that different display areas have different refresh frequencies. Similarly, by controlling the display panel to change the refresh frequency from different positions in the duration of each frame, the display panel can be controlled to realize the design that the plurality of display areas have the plurality of refresh frequencies in the display period.

Figure 5G:
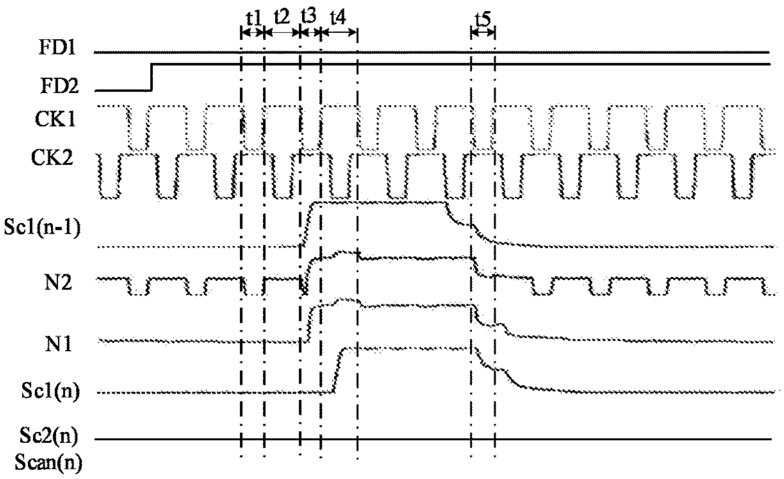

FIG. 5G is a timing diagram of the plurality of gate controlling signals Scan outputted by the gate driving unit, when the second frequency-dividing control signal FD2 has the active level state and the first frequency-dividing control signal FD1 has the active level state and an inactive level state switched. Where pl represents the effective pulse.

The (n−2)-th state gate controlling signal Scan(n−2) outputted by the (n−2)-th stage gate driving circuit GDC(n−2) and the (n−1)-th state gate controlling signal Scan(n−1) outputted by the (n−1)-th stage gate driving circuit GDC(n−1) have the effective pulses in each frame. The sub-pixels Pi receiving the (n−2)-th state gate controlling signal Scan(n−2) and the (n−1)-th state gate controlling signal Scan(n−1) in the display panel operate writing the data signal in each frame. The n-th stage gate controlling signal Scan(n) outputted by the n-th gate driving circuit GDC(n) and the (n+1)-th stage gate controlling signal Scan(n+1) outputted by the (n+1)-th gate driving circuit GDC(n+1) have the effective pulses in both the writing frame WF and part of the holding frame HF. The sub-pixels Pi receiving the n-th state gate controlling signal Scan(n) and the (n+1)-th state gate controlling signal Scan(n+1) in the display panel operate writing the data signal in the writing frame WF and part of the holding frame HF. The (n+2)-th state gate controlling signal Scan(n+2) outputted by the (n+2)-th stage gate driving circuit GDC(n+2) and the (n+3)-th state gate controlling signal Scan(n+3) outputted by the (n+3)-th stage gate driving circuit GDC(n+3) have the effective pulses in each frame. The sub-pixels Pi receiving the (n+2)-th state gate controlling signal Scan(n+2) and the (n+3)-th state gate controlling signal Scan(n+3) in the display panel operate writing the data signal in each frame, so that the display panel can achieve the purpose of having different refresh frequencies in different display areas.

Similarly, by controlling the second frequency-dividing control signal FD2, the position in the display panel where the refresh frequency change begins to occur can be controlled.

Optionally, when the display panel is designed to have different refresh frequencies in different display areas by using the gate driving circuit GDC shown in FIG. 2C, before the first frequency-dividing control signal FD1 starts to have an inactive level state, the clock signal CK has the plurality of transitions between the active level state and the inactive level state. Still take the sub-pixels Pi before the n-th row performs the operation of the writing frame WF, and the sub-pixels Pi after the n-th row performs the operation of the holding frame HF in the duration of one frame as examples, before the first frequency-dividing control signal FD1 has the inactive level state, the clock signal CK maintains the plurality of transitions between the active level state and the inactive level state, as shown in FIG. 5G, the gate controlling signal Scan(n) outputted from the first stage gate driving circuit GDC to the (n−1)-th stage gate driving circuit GDC can output the gate controlling signal Scan(n) having the effective pulse, so that the sub-pixels Pi before the n-th row can perform the operation of writing the data signal. When the first frequency-dividing control signal FD1 has the inactive level state, the clock signal CK can correspondingly maintain the inactive level state to save the power consumption.

Therefore, when the display panel is designed to have different refresh frequencies in different display areas by using the gate driving circuit GDC shown in FIG. 2C, in the holding frame HF, the clock signal CK may first enter the first period S1 (i.e., the clock signal CK has the plurality of transitions between the active level state and the inactive level state), and then enter the second period S2 for holding the inactive level state.

Similarly, when the display panel is designed with different refresh frequencies in different display areas by using the gate driving circuit GDC shown in FIG. 2D, in the holding frame HF, the clock signal CK may first enter the first period S1 and then enter the second period S2.

Optionally, the multistage gate driving circuits GDC share the same first frequency-dividing control signal FD1, and the multistage gate driving circuits GDC share the same second frequency-dividing control signal FD2, so as to reduce the number of the control signals used by the gate driving unit and save a wiring layout space.

Optionally, the multistage gate driving circuits GDC may apply different first frequency-dividing control signals FD1, and the multistage gate driving circuit GDC may apply different second frequency-dividing control signals FD2.

Figure 6:
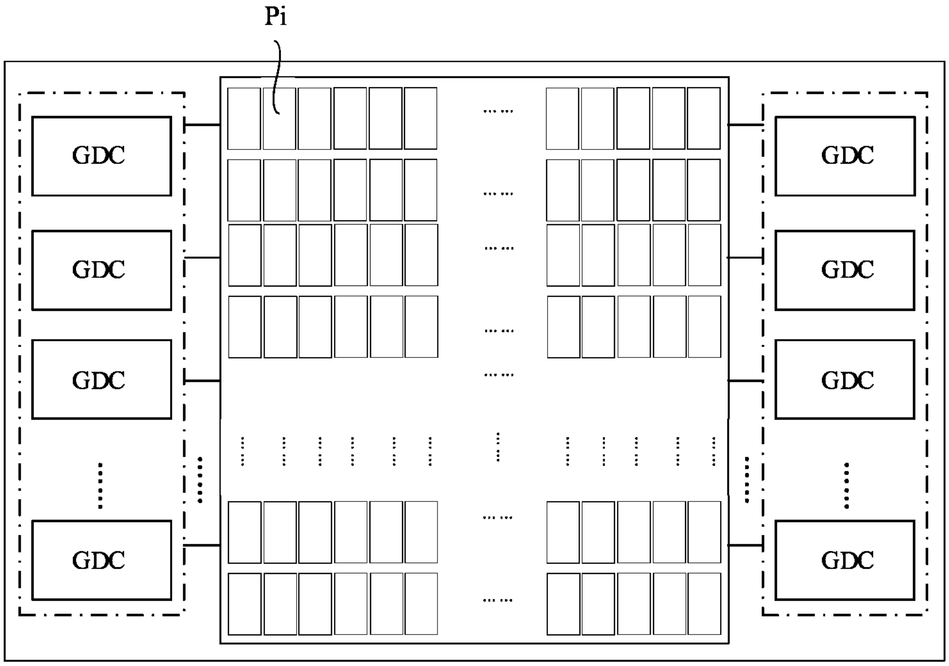
FIG. 6 is a schematic diagram of a display panel provided by an embodiment of the present disclosure.

FIG. 6 is a schematic diagram of a display panel provided by the embodiment of the present disclosure. The embodiment of the present disclosure further provides a display panel including any of the gate driving units and a plurality of sub-pixels Pi.

Figure 7:
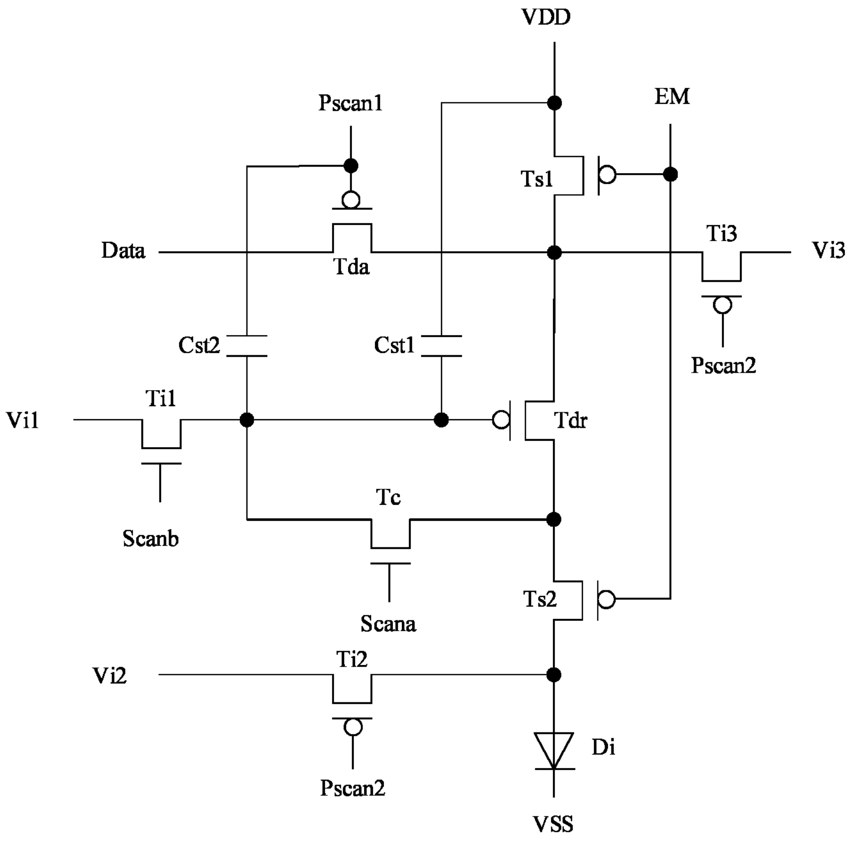
FIG. 7 is a circuit diagram of a sub-pixel provided by an embodiment of the present disclosure.

FIG. 7 is a circuit diagram of the sub-pixels Pi provided by the embodiment of the present disclosure. Each sub-pixel Pi includes a light-emitting device Di and a pixel driving circuit.

Optionally, the light-emitting device Di includes one kind of an organic light-emitting diode, a sub-millimeter light-emitting diode, and a micro light-emitting diode.

The pixel driving circuit includes a driving transistor Tdr and a compensation transistor Tc.

An input terminal and an output terminal of the driving transistor Tdr are electrically connected to the light-emitting device Di between a first voltage terminal VDD and a second voltage terminal VSS. The driving transistor Tdr is configured to generate a driving current for driving the light-emitting device Di to emit light according to a corresponding data signal Data.

An input terminal of the compensation transistor Tc is electrically connected to the output terminal of the driving transistor Tdr. An output terminal of the compensation transistor Tc is electrically connected to a control terminal of the driving transistor Tdr.

Optionally, the plurality of gate driving circuits GDC are configured to generate a plurality of gate controlling signals Scan for output to control the control terminals of the compensation transistors Tc of the plurality of sub-pixels Pi, so that the compensation transistors Tc are turned on or off according to the corresponding gate controlling signals Scan.

Optionally, the pixel driving circuit further includes a data transistor Tda, a first reset transistor Ti1, a second reset transistor Ti2, a first switching transistor Ts1, a second switching transistor Ts2, and a first storage capacitor Cst1.

A control terminal of the data transistor Tda is configured to receive a first scan signal Pscan1. An input terminal of the Data transistor Tda is configured to receive a data signal Data. An output terminal of the data transistor Tda is electrically connected to the input terminal of the driving transistor Tdr.

In the writing frame WF, the data transistors Tda of the plurality of sub-pixels Pi transmit the data signal Data to the input terminal of the driving transistor Tdr according to the first scan signal Pscan1.

An input terminal of the first reset transistor Ti1 is configured to receive a first reset signal Vi1. An output terminal of the first reset transistor Ti1 is electrically connected to the control terminal of the driving transistor Tdr.

A control terminal of the second reset transistor Ti2 is configured to receive a second scan signal Pscan2. An input terminal of the second reset transistor Ti2 is configured to receive a second reset signal Vi2. An output terminal of the second reset transistor Ti2 is electrically connected to an output terminal of the second switching transistor Ts2.

A control terminal of the first switching transistor Ts1 is configured to receive a corresponding light-emitting control signal EM. An input terminal of the first switching transistor Ts1 is electrically connected to the first voltage terminal VDD. An output terminal of the first switching transistor Ts1 is electrically connected to the input terminal of the driving transistor Tdr.

A control terminal of the second switching transistor Ts2 is configured to receive the corresponding light-emitting control signal EM. An input terminal of the second switching transistor Ts2 is electrically connected to the output terminal of the driving transistor Tdr. An output terminal of the second switching transistor Ts2 is electrically connected to the light-emitting device Di.

A first terminal of the first storage capacitor Cst1 is electrically connected to the first voltage terminal VDD. A second terminal of the first storage capacitor Cst1 is electrically connected to the control terminal of the driving transistor Tdr.

A cathode of the light-emitting device Di is electrically connected to the second voltage terminal VSS.

Optionally, the gate controlling signal Scan received by the control terminal of the compensation transistor Tc and the gate controlling signal Scan received by the control terminal of the first reset transistor Ti1 is generated by gate driving circuits GDC of different stages of the same gate driving unit. Optionally, the control terminal of the first reset transistor Ti1 of the sub-pixel Pi located in the n-th row is configured to receive the gate controlling signal Scan(n−1) generated by the (n−1)-th stage gate driving circuit GDC (n−1). The control terminal of the compensation transistor Tc of the sub-pixel Pi located in the n-th row is configured to receive the gate controlling signal Scan(n) generated by the nth stage gate driving circuit GDC(n).

Optionally, the gate controlling signal Scan received by the control terminal of the compensation transistor Tc and the gate controlling signal Scan received by the control terminal of the first reset transistor Ti1 is generated by different gate driving units.

For example, the display panel includes a first gate driving unit and a second gate driving unit. The circuit structures of the first gate driving unit and the second gate driving unit may be any one as shown in FIGS. 2A-2D. The first gate driving unit generates a plurality of first gate controlling signals Scana to output to the control terminals of the compensation transistors Tc of the plurality of sub-pixels Pi. The second gate driving unit generates a plurality of second gate controlling signals Scanb to output to the control terminals of the first reset transistor Ti1 of the plurality of sub-pixels Pi.

Optionally, the first scan signal Pscan1 and the second scan signal Pscan2 may be the same signal or may be different signals.

Optionally, the control terminal of the first switching transistor Ts1 and the control terminal of the second switching transistor Ts2 may share the same light-emitting control signal EM, or different light-emitting control signals EM.

Optionally, the pixel driving circuit further includes a third reset transistor Ti3. An input terminal of the third reset transistor Ti3 is configured to receive a third reset signal Vi3. An output terminal of the third reset transistor Ti3 is electrically connected to the input terminal of the driving transistor Tdr. Optionally, a control terminal of the third reset transistor Ti3 is electrically connected to the control terminal of the second reset transistor Ti2.

Optionally, the pixel driving circuit further includes a second storage capacitor Cst2. A first terminal of the second storage capacitor Cst2 is electrically connected to the control terminal of the data transistor Tda. A second terminal of the second storage capacitor Cst2 is electrically connected to the control terminal of the driving transistor Tdr.

Optionally, at least one of the compensation transistor Tc and the first reset transistor Ti1 is an oxide transistor.

Optionally, at least one of the compensation transistor Tc and the first reset transistor Ti1 is an N-type transistor.

Figure 8:
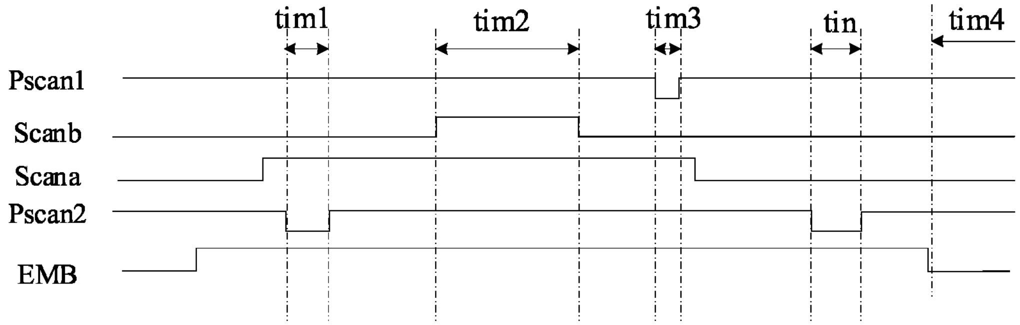
FIG. 8 is a timing diagram corresponding to the sub-pixel shown in FIG. 7.

FIG. 8 is a timing diagram corresponding to the sub-pixels shown in FIG. 7. Referring to FIG. 8, the operation principle of the pixel driving circuit will be explained with the control terminal of the compensation transistor Tc receiving the first gate controlling signal Scana and the control terminal of the first reset transistor Ti1 receiving the second gate controlling signal Scanb.

In a first reset period tim1, the second reset transistor Ti2 and the third reset transistor Ti3 are turned on according to the second scan signal Pscan2, and the compensation transistor Tc is turned on according to the first gate controlling signal Scana, so that the anode of the light-emitting device Di is reset according to the second reset signal Vi2, and the input terminal, the output terminal, and the control terminal of the driving transistor Tdr are reset according to the third reset signal Vi3.

In a second reset period tim2, the first reset transistor Ti1 is turned on according to the second gate controlling signal Scanb, and the compensation transistor Tc is turned on according to the first gate controlling signal Scana, so that the output terminal and the control terminal of the driving transistor Tdr are reset according to the first reset signal Vi1.

In a data writing period tim3, the data transistor Tda is turned on according to the corresponding first scan signal Pscan1, and the compensation transistor Tc is turned on according to the corresponding first gate controlling signal Scana, so that the control terminal of the driving transistor Tdr writes the data signal Data.

In a light-emitting period tim4, the first switching transistor Ts1 and the second switching transistor Ts1 are turned on according to the light-emitting control signal EM, so that the driving transistor Tdr generates a driving current to drive the corresponding light-emitting device Di to emit light.

Optionally, a third reset period tin is further included between the light-emitting period tim4 and the data writing period tim3. In the third reset period tin, the second reset transistor Ti2 and the third reset transistor Ti3 are turned on according to the second scan signal Pscan2, so that the anode of the light-emitting device Di is reset according to the second reset signal Vi2, and the input terminal and the output terminal of the driving transistor Tdr are reset according to the third reset signal Vi3.

When the gate controlling signal Scan output by the corresponding gate driving circuit GDC controlled by the first frequency-dividing control signal FD1 and/or the second frequency-dividing control signal FD2 has no effective pulse, the compensation transistor Tc and the first reset transistor Ti1 of the sub-pixel Pi applying the gate controlling signal Scan are turned off, so that the sub-pixel Pi cannot reset the control terminal of the driving transistor Tdr in the first reset period tim1 and the second reset period tim2. The data signal Vdata cannot be transmitted to the control terminal of the driving transistor Tdr in the data writing period tim3, so that the sub-pixel Pi applying the gate controlling signal Scan correspondingly realizes the display function of the holding frame HF.

Figure 9:
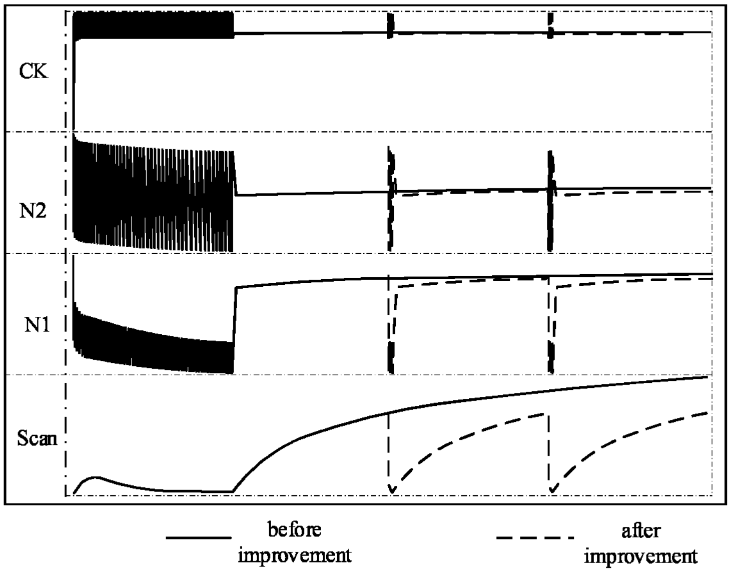
FIG. 9 is a simulation verification timing diagram provided by an embodiment of the present disclosure.

FIG. 9 is a simulation verification timing diagram provided by an embodiment of the present disclosure. In the vertical blanking period bt, the inventors make that the clock signal CK have 10 transitions between the active level state and the inactive level state. The simulation verification shows that the potential at the first node N1 can be pulled back down to −20V, and then raised step by step. Accordingly, the gate controlling signal Scan is also pulled down to equal to the first power supply signal, and then the potentials of the first output terminal out1 and the second output terminal out2 are raised again.

The principle and implementations of the present disclosure are described in this specification by using specific examples. The description about the foregoing embodiments is merely provided to help understand the method and core ideas of the present disclosure. In addition, persons of ordinary skill in the art can make modifications in terms of the specific implementations and application scopes according to the ideas of the present disclosure. Therefore, the content of this specification shall not be construed as a limit to the present disclosure.

What is claimed is:

1. A gate driving unit, comprising a plurality of gate driving circuits configured to output a plurality of gate controlling signals to a plurality of sub-pixels of a display panel, each of the plurality of gate driving circuits comprising:

a starting transistor, wherein a control terminal of the starting transistor is configured to receive a clock signal, and an input terminal of the starting transistor is configured to receive a starting signal; and a first output transistor, wherein an output terminal of the starting transistor is electrically connected to a control terminal of the first output transistor, an input terminal of the first output transistor is electrically connected to a first power supply terminal, and an output terminal of the first output transistor is electrically connected to a first output terminal of a current stage gate driving circuit;

wherein in a writing frame of the display panel, the clock signal comprises a plurality of transitions between an active level state and an inactive level state; in a plurality of holding frames of the display panel, the clock signal comprises a plurality of first periods holding the inactive level state, and the clock signal comprises the plurality of transitions between the active level state and the inactive level state in a second period between two adjacent first periods;

wherein each of the holding frames comprises a display period and a vertical blanking period; the second period corresponds to the vertical blanking period.

2. The gate driving unit according to claim 1, wherein the plurality of first periods have an equal duration.

3. The gate driving unit according to claim 1, wherein the clock signal comprises a first clock signal and a second clock signal;

the control terminal of the starting transistor of odd-numbered stage gate driving circuits is configured to receive the first clock signal, and the control terminal of the starting transistor of even-numbered stage gate driving circuits is configured to receive the second clock signal;

wherein in the writing frame, the first clock signal and the second clock signal have opposite phases; in the holding frames, the first periods of the first clock signal holding the inactive level state overlap the first periods of the second clock signal holding the inactive level state, and the second period of the first clock signal overlaps the second period of the second clock signal.

4. The gate driving unit according to claim 3, wherein in the second period of the first clock signal, the first clock signal is inverted to the second clock signal.

5. The gate driving unit according to claim 3, wherein each of the gate driving circuits further comprises:

a first transistor, wherein a control terminal of the first transistor is electrically connected to the control terminal of the starting transistor, and an input terminal of the first transistor is electrically connected to the first power supply terminal;

a second transistor, wherein a control terminal of the second transistor is electrically connected to the output terminal of the starting transistor, an input terminal of the second transistor is electrically connected to the control terminal of the starting transistor, and the output terminal of the second transistor is electrically connected to an output terminal of the first transistor;

a third transistor, wherein a control terminal of the third transistor is electrically connected to the output terminal of the first transistor;

a fourth transistor, wherein a control terminal of the fourth transistor is electrically connected to an input terminal of the third transistor, and an input terminal of the fourth transistor is electrically connected to an output terminal of the third transistor;

a fifth transistor, wherein a control terminal of the fifth transistor is electrically connected to the output terminal of the starting transistor, an input terminal of the fifth transistor is electrically connected to a second power supply terminal, and an output terminal of the fifth transistor is electrically connected to an output terminal of the fourth transistor;

a sixth transistor, wherein a control terminal of the sixth transistor is electrically connected to the output terminal of the first transistor, and an input terminal of the sixth transistor is electrically connected to the second power supply terminal;

a seventh transistor, wherein an input terminal of the seventh transistor is electrically connected to an input terminal of the third transistor, and an output terminal of the seventh transistor is electrically connected to an output terminal of the sixth transistor;

an eighth transistor, wherein a control terminal of the eighth transistor and an input terminal of the eighth transistor are electrically connected to a control terminal of the seventh transistor, and an output terminal of the eighth transistor is electrically connected to the control terminal of the first output transistor;

a ninth transistor, wherein a control terminal of the ninth transistor is electrically connected to the control terminal of the starting transistor, an input terminal of the ninth transistor is electrically connected to the input terminal of the starting transistor, and an output terminal of the ninth transistor is electrically connected to the control terminal of the seventh transistor;

a second output transistor, wherein a control terminal of the second output transistor is electrically connected to the output terminal of the fourth transistor, an input terminal of the second output transistor is electrically connected to the second power supply terminal, and an output terminal of the second output transistor is electrically connected to the output terminal of the first output transistor;

a first capacitor, wherein a first terminal of the first capacitor is electrically connected to the control terminal of the third transistor, and a second terminal of the first capacitor is electrically connected to the output terminal of the third transistor;

a second capacitor, wherein a first terminal of the second capacitor is electrically connected to the control terminal of the seventh transistor, and a second terminal of the second capacitor is electrically connected to the output terminal of the seventh transistor; and a third capacitor, wherein a first terminal of the third capacitor is electrically connected to the control terminal of the second output transistor, and a second terminal of the third capacitor is electrically connected to the input terminal of the second output transistor;

wherein the control terminal of the fourth transistor of the odd-numbered stage gate driving circuits is configured to receive the second clock signal, and the control terminal of the fourth transistor of the even-numbered stage gate driving circuits is configured to receive the first clock signal.

6. The gate driving unit according to claim 5, wherein each of the gate driving circuits further comprises:

a first shielding transistor, wherein a control terminal of the first shielding transistor is electrically connected to the first power supply terminal, an input terminal of the first shielding transistor is electrically connected to the output terminal of the first transistor, and an output terminal of the first shielding transistor is electrically connected to the control terminal of the third transistor;

a second shielding transistor, wherein a control terminal of the second shielding transistor is electrically connected to the first power supply terminal, an input terminal of the second shielding transistor is electrically connected to the output terminal of the starting transistor, and an output terminal of the second shielding transistor is electrically connected to the control terminal of the first output transistor;

a third shielding transistor, wherein a control terminal of the third shielding transistor is electrically connected to the first power supply terminal, an input terminal of the third shielding transistor is electrically connected to the output terminal of the ninth transistor, and an output terminal of the third shielding transistor is electrically connected to the control terminal of the eighth transistor; and a tenth transistor, wherein a control terminal of the tenth transistor is electrically connected to a power-on reset control line, an input terminal of the tenth transistor is electrically connected to the second power supply terminal, and an output of the tenth transistor is electrically connected to the control terminal of the first output transistor.

7. The gate driving unit according to claim 5, wherein each of the gate driving circuits further comprises:

a first frequency-dividing transistor, wherein a control terminal of the first frequency-dividing transistor is electrically connected to a first frequency-dividing control line, an input terminal of the first frequency-dividing transistor is electrically connected to the output terminal of the fourth transistor, and an output terminal of the first frequency-dividing transistor is electrically connected to the control terminal of the second output transistor.

8. The gate driving unit according to claim 5, wherein each of the gate driving circuits further comprises:

a second frequency-dividing transistor, wherein a control terminal of the second frequency-dividing transistor is electrically connected to the output terminal of the starting transistor, and an input terminal of the second frequency-dividing transistor is electrically connected to a second frequency-dividing control line;

a third frequency-dividing transistor, wherein a control terminal of the third frequency-dividing transistor is electrically connected to an output terminal of the second frequency-dividing transistor, and an input terminal of the third frequency-dividing transistor is electrically connected to the control terminal of the control terminal of the second output transistor;

a fourth frequency-dividing transistor, wherein a control terminal of the fourth frequency-dividing transistor is electrically connected to the control terminal of the second frequency-dividing transistor, and an input terminal of the fourth frequency-dividing transistor is electrically connected to the second power supply terminal, and an output terminal of the fourth frequency-dividing transistor is electrically connected to an output terminal of the third frequency-dividing transistor;

a third output transistor, wherein a control terminal of the third output transistor is electrically connected to the control terminal of the first output transistor, an input terminal of the third output transistor is electrically connected to the first power supply terminal, and an output terminal of the third output transistor is electrically connected to a second output terminal of the gate driving circuit of the gate driving circuit of the current stage;

a fourth output transistor, wherein a control terminal of the fourth output transistor is electrically connected to the output terminal of the third frequency-dividing transistor, an input terminal of the fourth output transistor is electrically connected to the second power supply terminal, and an output terminal of the fourth output transistor is electrically connected to the output terminal of the third output transistor;

a fourth capacitor, wherein a first terminal of the fourth capacitor is electrically connected to the input terminal of the fourth output transistor, and a second terminal of the fourth capacitor is electrically connected to the control terminal of the fourth output transistor; and a fifth capacitor, wherein a first terminal of the fifth capacitor is electrically connected to the output terminal of the second frequency-dividing transistor, and a second terminal of the fifth capacitor is electrically connected to the input terminal of the fourth output transistor.

9. A display panel, comprising a gate driving unit and a plurality of sub-pixels; the gate driving unit comprising a plurality of gate driving circuits configured to output a plurality of gate controlling signals to the plurality of sub-pixels; each of the plurality of gate driving circuits comprising:

a starting transistor, wherein a control terminal of the starting transistor is configured to receive a clock signal, and an input terminal of the starting transistor is configured to receive a starting signal; and a first output transistor, wherein an output terminal of the starting transistor is electrically connected to a control terminal of the first output transistor, an input terminal of the first output transistor is electrically connected to a first power supply terminal, and an output terminal of the first output transistor is electrically connected to a first output terminal of the gate driving circuit of a current stage;

wherein in a writing frame of the display panel, the clock signal comprises a plurality of transitions between an active level state and an inactive level state; in a plurality of holding frames of the display panel, the clock signal comprises a plurality of first periods holding the inactive level state, and the clock signal comprises the plurality of transitions between the active level state and the inactive level state in a second period between two adjacent first periods;

wherein each of the sub-pixels comprises:

a light-emitting device; and a pixel driving circuit, comprising a driving transistor and a compensation transistor, wherein the driving transistor is configured to generate a driving current for driving the light-emitting device to emit light according to a corresponding data signal, an input terminal of the compensation transistor is electrically connected to an output terminal of the driving transistor, and an output terminal of the compensation transistor is electrically connected to a control terminal of the driving transistor;

wherein the plurality of gate driving circuits are configured to generate the plurality of gate controlling signals for output to the control terminal of the compensation transistor of the plurality of sub-pixels;

wherein each of the holding frames comprises a display period and a vertical blanking period; the second period corresponds to the vertical blanking period.

10. The display panel according to claim 9, wherein the pixel driving circuit further comprises:

a first reset transistor, wherein an input terminal of the first reset transistor is configured to receive a first reset signal, and an output terminal of the first reset transistor is electrically connected to the control terminal of the driving transistor;

wherein the gate controlling signals received by the control terminal of the compensation transistor and the gate controlling signals received by a control terminal of the first reset transistor are generated by the gate driving circuits of different stages of the same gate driving unit.

11. The display panel according to claim 9, wherein the plurality of first periods have an equal duration.

12. The display panel according to claim 9, wherein the clock signal comprises a first clock signal and a second clock signal;

the control terminal of the starting transistor of odd-numbered stage gate driving circuit is configured to receive the first clock signal, and the control terminal of the starting transistor of even-numbered stage gate driving circuits is configured to receive the second clock signal;

wherein in the writing frame, the first clock signal and the second clock signal have opposite phases; in the hold periods, the first periods of the first clock signal holding the inactive level state overlap the first periods of the second clock signal holding the inactive level state, and the second period of the first clock signal overlaps the second period of the second clock signal.

13. The display panel according to claim 12, wherein in the second period of the first clock signal, the first clock signal is inverted to the second clock signal.

14. A gate driving unit, comprising a plurality of gate driving circuits configured to output a plurality of gate controlling signals to a plurality of sub-pixels of a display panel, each of the plurality of gate driving circuits comprising:

a starting transistor, wherein a control terminal of the starting transistor is configured to receive a clock signal, and an input terminal of the starting transistor is configured to receive a starting signal; and a first output transistor, wherein an output terminal of the starting transistor is electrically connected to a control terminal of the first output transistor, an input terminal of the first output transistor is electrically connected to a first power supply terminal, and an output terminal of the first output transistor is electrically connected to a first output terminal of a current stage gate driving circuit;

wherein in a writing frame of the display panel, the clock signal comprises a plurality of transitions between an active level state and an inactive level state; in a plurality of holding frames of the display panel, the clock signal comprises a plurality of first periods holding the inactive level state, and the clock signal comprises the plurality of transitions between the active level state and the inactive level state in a second period between two adjacent first periods;

wherein the plurality of first periods have an equal duration.

* * * * *